US011776261B2

(12) United States Patent
Phillips et al.

(10) Patent No.: US 11,776,261 B2
(45) Date of Patent: Oct. 3, 2023

(54) CONTEXT-AWARE EVENT BASED ANNOTATION SYSTEM FOR MEDIA ASSET

(71) Applicant: Spherex, Inc., Santa Clara, CA (US)

(72) Inventors: Teresa Ann Phillips, Los Altos, CA (US); Pranav Anand Joshi, Cerritos, CA (US); Kira Michelle McStay, Los Angeles, CA (US)

(73) Assignee: SPHEREX, INC., Santa Clara, CA (US)

( * ) Notice: Subject to any disclaimer, the term of this patent is extended or adjusted under 35 U.S.C. 154(b) by 0 days.

(21) Appl. No.: 17/246,456

(22) Filed: Apr. 30, 2021

(65) Prior Publication Data

US 2022/0350990 A1 Nov. 3, 2022

(51) Int. Cl.
| | |
|---|---|
| *G06V 20/40* | (2022.01) |
| *H04N 21/472* | (2011.01) |
| *H04N 21/466* | (2011.01) |
| *G06T 7/00* | (2017.01) |
| *G06F 18/40* | (2023.01) |
| *G06F 18/214* | (2023.01) |
| *G06F 18/241* | (2023.01) |

(52) U.S. Cl.
CPC ............ *G06V 20/41* (2022.01); *G06F 18/214* (2023.01); *G06F 18/241* (2023.01); *G06F 18/40* (2023.01); *G06T 7/0002* (2013.01); *H04N 21/4662* (2013.01); *H04N 21/472* (2013.01); *G06T 2207/10016* (2013.01); *G06V 20/44* (2022.01); *G06V 2201/10* (2022.01)

(58) Field of Classification Search
CPC .... G06V 20/41; G06V 20/44; G06V 2201/10; G06K 9/6253; G06K 9/6256; G06K 9/6268; G06T 7/0002; G06T 2207/10016; H04N 21/4662; H04N 21/472
See application file for complete search history.

(56) References Cited

U.S. PATENT DOCUMENTS

| | | | |
|---|---|---|---|
| 8,396,286 B1 * | 3/2013 | Aradhye | G06V 30/1916 382/190 |
| 8,452,778 B1 * | 5/2013 | Song | G06F 16/7844 707/748 |

(Continued)

OTHER PUBLICATIONS

"International Application Serial No. PCT/US2022/023105, International Search Report dated Aug. 2, 2022", 2 pgs.

(Continued)

*Primary Examiner* — John R Schnurr
(74) *Attorney, Agent, or Firm* — SCHWEGMAN LUNDBERG & WOESSNER, P.A.

(57) ABSTRACT

Various embodiments described herein support or provide for annotation of a media asset, such as an audio asset or a video asset, based on one or more events identified within content of the media asset. In particular, some embodiments can determine one or more of the following details with respect to content of a given media asset, which can represent annotations that enable determination of contextual information for the given media asset: events; event classification labels for events; subclassifications labels for events; scenes comprising events; attributes of scenes; themes presented by the content; and title-level attributes of the given media asset.

25 Claims, 13 Drawing Sheets

(56) References Cited

U.S. PATENT DOCUMENTS

| | | | |
|---|---|---|---|
| 8,819,024 B1* | 8/2014 | Toderici | G06V 20/41 |
| | | | 707/754 |
| 9,087,297 B1* | 7/2015 | Filippova | G06F 16/70 |
| 9,111,146 B2* | 8/2015 | Dunlop | G06V 20/41 |
| 10,262,239 B2* | 4/2019 | Polak | G06V 30/274 |
| 10,643,074 B1 | 5/2020 | Mcaninly et al. | |
| 10,789,291 B1* | 9/2020 | Zadeh | G06K 9/6268 |
| 10,810,367 B2* | 10/2020 | Maratta | G06F 40/30 |
| 10,848,791 B1 | 11/2020 | Germano et al. | |
| 10,897,649 B1* | 1/2021 | Germano | G06N 20/00 |
| 10,897,658 B1 | 1/2021 | Sethu et al. | |
| 11,122,341 B1* | 9/2021 | Decrop | H04N 21/44008 |
| 11,355,154 B2* | 6/2022 | Tuan | G06N 3/045 |
| 2008/0162561 A1* | 7/2008 | Naphade | G06F 16/7857 |
| 2008/0184120 A1 | 7/2008 | Obrien-strain et al. | |
| 2009/0208106 A1* | 8/2009 | Dunlop | G06V 20/10 |
| | | | 382/173 |
| 2010/0142803 A1 | 6/2010 | Wang et al. | |
| 2014/0250032 A1 | 9/2014 | Huang et al. | |
| 2016/0034786 A1 | 2/2016 | Suri et al. | |
| 2017/0078767 A1* | 3/2017 | Borel | G11B 27/031 |
| 2018/0025079 A1 | 1/2018 | Xiao et al. | |
| 2018/0032845 A1* | 2/2018 | Polak | G06K 9/6269 |
| 2021/0133456 A1* | 5/2021 | Lee | G06F 18/21 |
| 2021/0174089 A1* | 6/2021 | Rao | G06V 20/41 |

OTHER PUBLICATIONS

"International Application Serial No. PCT/US2022/023105, Written Opinion dated Aug. 2, 2022", 6 pgs.

* cited by examiner

Metadata

| Release Year * (602) | Runtime * (604) |
|---|---|
| 2021 > | 00:02:10 |

| US Rating (606) | US Content Advisory (608) |
|---|---|
| ---Select--- > | Advisory Rating > |

| Writers * (610) | Directors * (612) |
|---|---|
| Bryce Zabel, Jackie Zabel | Hiroki Yamada, Seiichi Shirato |

| Producers * (614) | Production Company * (616) |
|---|---|
| Caroline James, Lauren Houseman, Michae | Hallmark Entertainment |

**Cast * (618)**

Shailene Woodley, Theo James (Tobias Eaton), Tobias Eaton, Miles Teller (Peter), Kate Winslet, Jeanine Matthews

Select a best option for each row

- Fiction | Non-Fiction | Educational — 910-1
- Not Animated | Animated for Children | Animated for Adults — 910-2
- Documentary With Adult Themes | Documentary With No Adult Themes | Not a Documentary — 910-3
- Comedic | Dramatic | Neutral — 910-4
- Neutral | Historical | Present Day | Future — 910-5
- Realistic | Fantasy | Sci-Fi | Comic Book — 910-6
- Romantic | Not Romantic — 910-7
- Twisting Narrative | Easy Narrative | Complicated Narrative — 910-8

902

Select all that apply

- Alternate Universe | Anti-Drug | Dark Atmosphere | Grindhouse | High Intensity | Horror

904

Go Back | Finish Screening

900

CONTEXT-AWARE EVENT BASED ANNOTATION SYSTEM FOR MEDIA ASSET

TECHNICAL FIELD

The present disclosure relates generally to media assets, and, more particularly, various embodiments described herein provide for systems, methods, techniques, instruction sequences, and devices that facilitate annotation of a media asset, such as an audio asset or a video asset, based on one or more events identified within content of the media asset.

BACKGROUND

The Media and Entertainment industry is experiencing an unprecedented global growth in content creation, distribution, and consumption. Film and television content created in one country can now seek distribution in over two hundred countries and territories and can be enjoyed by consumers representing thousands of cultures and sub-cultures. With wider access to so many new consumers, it's no surprise that the number of titles released annually is growing exponentially, but this rapid growth makes making it difficult for humans alone to accurately and consistently prepare each title for global distribution. Additionally, the simultaneous and exponential growth of film and television, streaming platforms, and global audiences is creating a burden and challenge that has never existed before. This pace of growth cannot be sustained without technological innovation.

The simultaneous and exponential growth of film and television, streaming platforms, and global audiences is creating a burden and challenge that has never existed before. This pace of growth cannot be sustained without technological innovation. Finding solutions to these challenges requires deep domain expertise in Media and Entertainment, understanding the cultures and complexities of the global regulatory environment, and a vision for how properly engineered and trained ML and AI systems can reduce bias, improve efficiency, ensure public safety, recognize cultural and religious norms, and accelerate time-to-market.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

FIG. 6 illustrates an example graphical user interface for metadata for a media asset, according to various embodiments of the present disclosure.

FIG. 8 illustrates an example graphical user interface for one or more event subclassification labels for an event of a media asset, according to various embodiments of the present disclosure.

FIG. 9 illustrates an example graphical user interface for one or more title attributes, according to various embodiments of the present disclosure.

DETAILED DESCRIPTION

Figure 1:
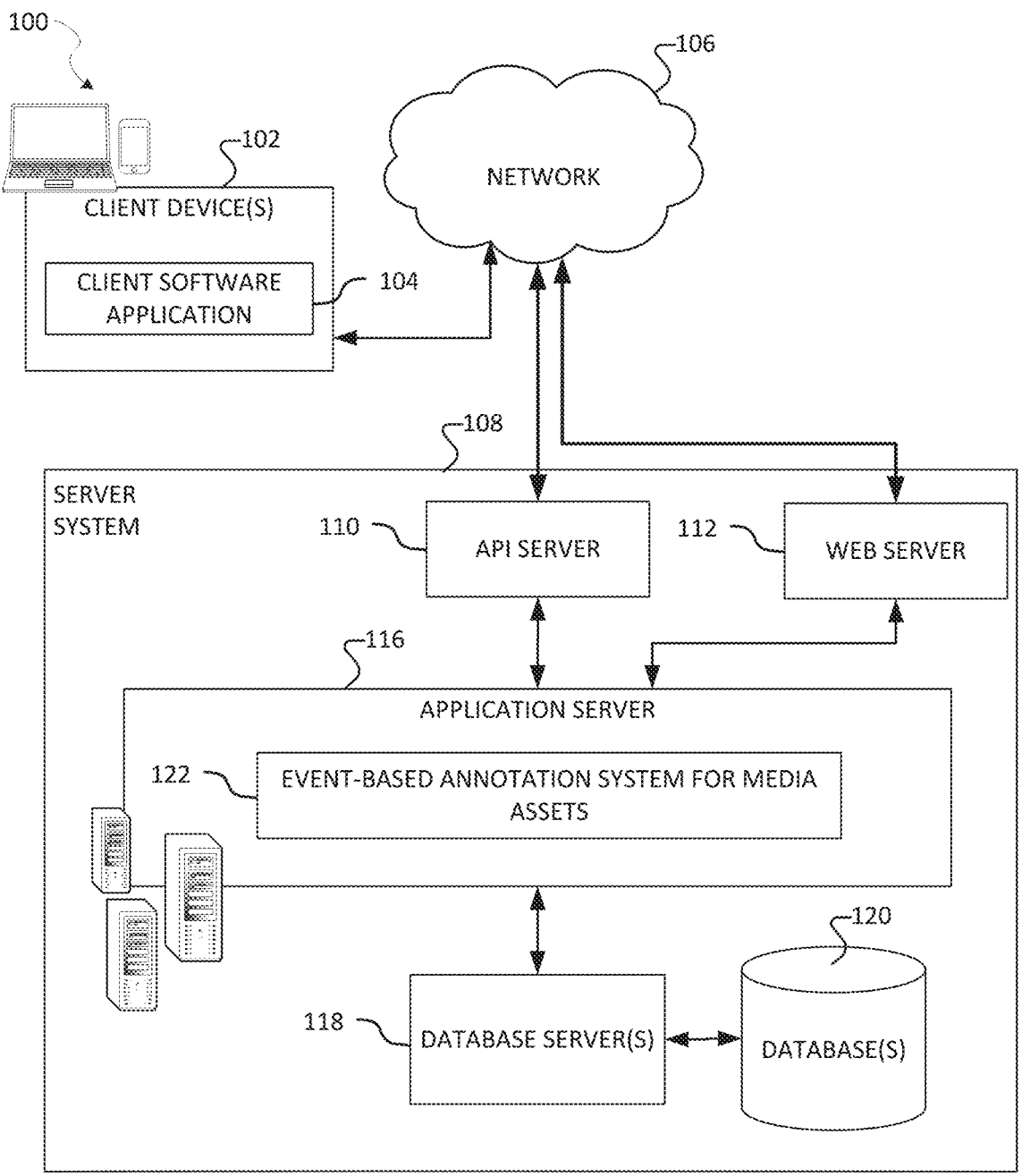
FIG. 1 is a block diagram showing an example data system that includes an event-based annotation system for media assets, according to various embodiments of the present disclosure.

The ML and AI technologies of today can face significant challenges supporting Media & Entertainment, specifically as it relates to interpretability, explainability, and bias. Interpretability can be the observation of cause and effect within the system; in other words, it describes the "What" aspect of the results. Explainability can refer to the "Why" aspect of an outcome and provides reasoning as to why the system generates results in a certain way. Explainability in AI systems can be crucial in providing insights into the data and decision points applied for prediction or recommendation. Bias in AI systems can be defined as the concept of observing outcomes that are consistently and systematically prejudiced due to incorrect assumptions. In global media asset recommendation systems, bias can arise from the choice of training data that is not representative of the larger population (e.g., training data misses the cultural context altogether, or is weight a single context type too heavily).

ML and AI systems usually require data curation by humans ("human annotators") for annotations and labeling. These human annotators can face two specific challenges in manual content curation. First, humans subconsciously possess a culture-of-origin bias that may result in discriminatory labeling of emotional events, scenes, themes, moods, and time periods across video frames. Second, with millions of hours of global content processed daily, humans cannot consistently and accurately perform annotations at peak levels, resulting in data incongruities. Since data sets curated by humans are necessary inputs for training machine learning models, when biased training data (a phenomenon also known to cause algorithmic prejudice and negative legacy) is processed by an AI system, it amplifies the bias, resulting in inaccurate predictions.

Various embodiments described herein address these and other deficiencies of the conventional art. For example, various embodiments described herein can use state-of-art machine learning (ML) and artificial intelligence (AI) to analyze and process millions of hours of video content created daily in order to effectively support content recommendations, search and discovery, audience targeting, and compliance with global regulations. More particularly, some embodiments described herein support or provide for annotation of a media asset, such as an audio asset or a video asset, based on one or more events identified within content of the media asset. In particular, some embodiments can determine (e.g., identify) one or more of the following details with respect to content of a given media asset, which can represent annotations that enable determination (e.g., extraction) of contextual information for the given media asset: events; event classification labels for events; subclassification labels for events; scenes comprising events; attributes of scenes; themes presented by the content; and title-level attributes of the given media asset. For some embodiments, the determined (e.g., extracted) contextual information represents information that has been determined while reducing or removing cultural biases from reviewing and annotating media assets.

For instance, some embodiments provide for annotating a media asset, such as a video asset (e.g., movie release, television episode, made-for television movie, etc.), based on one or more events identified in content (e.g., visual, audio, text, speech content, or some combination thereof) presented by the media asset. Various embodiments enable classification and subclassification of events (identified in content of a media asset) based on classes and subclasses defined by a predetermined event classification ontology or taxonomy, where the predetermined event classification ontology/taxonomy is defined (e.g., configured with classes and subclasses) such that contextual information can be determined (e.g., extracted) from the media asset in a manner that reduces or avoids cultural bias. For example, using events that are classified based on classes and subclasses of the predetermined event classification ontology/taxonomy, some embodiments can determine (e.g., extract) contextual information regarding those events as they relate to, for example, alcohol, blasphemy, cinematography, discrimination, horror, imaginary, LGBTQ (lesbian, gay, bisexual, transgender and queer), nudity, violence, political extremism, profanity, sex, and violence. The classified and subclassified events of a media asset can enable determination of other contextual information for the media asset, such as contextual information regarding scenes in content of the media asset (where each scene comprises one or more events), contextual information regarding themes presented in the content, title-level contextual information for the media asset, and the like.

By use of the predetermined event classification ontology/taxonomy, various embodiments can provide baseline information regarding content of a given media asset prior to cultural biases (e.g., those of a specific people, community, culture, region, country, etc.) being considered (e.g., applied) in downstream analysis of the given media asset (e.g., subsequent analysis for: predicting rating, content classification, generating content advisory, generating trailer, performing compliance review, audience segmentation or targeting, scene skipping, content filtering, predicting cultural appeal or aversion of the media asset, and the like). For example, the cultural bias that is effectively being reduced or removed from the contextual information extraction process can be: that of the one or more individuals (e.g., director, screenwriter, actors, and other cast members) who helped create the content within a media asset; that of a human reviewer that is annotating the media asset; or that of an audience member who will eventually observe the media asset. The predetermined event classification ontology/taxonomy can represent expert knowledge data that is captured (e.g., by human reviewers or by automated processes) over time, and can be updated from time to time (e.g., periodically) based on changes observed in the world (e.g., cultural changes, changes in government regulation or policy, changes in rating systems, recent events, or the like, which can result in an addition or a modification to the predetermined event classification ontology/taxonomy).

Use of an embodiment described herein can not only enable annotation of a media asset, but can also include training one or more machine learning models to auto annotate (or assist a user in annotating) media assets at scale. For instance, a user can classify (e.g., tag) or sub-classify (e.g., sub-tag) one or more events of a current media asset. The classification/subclassifications and visual/audio/text analysis signals for a given event at a particular timestamp can serve as input features for training by one or more machine learning models, thereby training the one or more machine learning models to auto determine (e.g., identify) events, event classifications, and event subclassifications in other media assets. In this way, user selections of events, event classifications, and event subclassifications can train one or more machine learning models on what input features should be extracted from a given media asset to annotate the given media asset.

As used herein, an event can comprise an audio content element (e.g., music, background noise, etc.), a visual content element (e.g., video, visual effects, colors, etc.), a textual content element (e.g., subtitles), a speech content element (e.g., dialog during an event or over a scene), or some combination thereof, that occurs within (e.g., is presented by) content of a media asset at a particular point on a timeline (e.g., a particular timestamp or timecode) of the media asset. For instance, a given event can comprise one or more of noise generated, music played, items displayed, actions or activity displayed by an actor, or words spoken. As used herein, an emotional event can refer to an event that has the possibility of invoking an emotional response in an audience member who observes or experiences the event.

As used herein, a scene can comprise multiple events that occur within (e.g., are presented by) content of a media asset over a duration of a timeline (e.g., a range of timestamps or timecodes) of the media asset. As used herein, timestamp and timecode are used interchangeably.

As used herein, a machine learning (ML) model can comprise any predictive model that is generated based on (or that is trained on) training data. Once generated/trained, a machine learning model can receive one or more inputs (e.g., one or more features) and generate an output for the inputs based on the model's training. Different types of machine learning models can include, without limitation, ones trained using supervised learning, unsupervised learning, reinforcement learning, or deep learning (e.g., complex neural networks).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes an event-based annotation system for media assets (hereafter, the event-based annotation system 122), according to various embodiments of the present disclosure. By including the event-based annotation system 122, the data system 100 can facilitate annotation of content of a media asset as described herein, which in turn can enable generation of contextual information for the content. In particular, a user at the client device 102 can access the event-based annotation system 122 (e.g., via a graphical user interface presented on a software application on the client device 102) and use the event-based annotation system 122 to annotate a media asset (e.g., video asset or audio asset) selected by the user. According to some embodiments, the event-based annotation system 122 annotates a given media asset by determining (e.g., identifying) one or more of the following details with respect to content of the given media asset, which can enable determination of contextual information for the given media asset: events; event classification labels for events (e.g., tags); subclassifications labels for events (e.g., sub-tags); scenes comprising events; attributes of scenes; themes presented by the content; and title-level attributes of the given media asset.

As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via the network 106.

The server system 108 provides server-side functionality via the network 106 to the client software application 104. While certain functions of the data system 100 are described herein as being performed by the event-based annotation system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 where the client device 102 provides media asset annotation operations, such as determining (e.g., identifying) events in a media asset, classifying events, subclassifying events, determining (e.g., identifying) scenes in the media asset, determining scene attributes, determining themes presented by the media asset, and determining title-level attributes for the media asset.

The server system 108 supports various services and operations that are provided to the client software application 104 by the event-based annotation system 122. Such operations include transmitting data from the event-based annotation system 122 to the client software application 104, receiving data from the client software application 104 to the event-based annotation system 122, and the event-based annotation system 122 processing data generated by the client software application 104. This data may include for example, requests and responses relating to screening content of a media asset, or relating to identifying events, event classification labels, event subclassification labels, scenes, scene attributes, themes, or title-level attributes for a media asset. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, each of an Application Program Interface (API) server 110 and a web server 112 is coupled to an application server 116, which hosts the event-based annotation system 122. The application server 116 is communicatively coupled to a database server 118, which facilitates access to a database 120 that stores data associated with the application server 116, including data that may be generated or used by the event-based annotation system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the event-based annotation system 122 of the application server 116 including, without limitation: screening content of a media asset; or identifying events, event classification labels, event subclassification labels, scenes, scene attributes, themes, or title-level attributes for a media asset.

The application server 116 hosts a number of applications and subsystems, including the event-based annotation system 122, which supports various functions and services with respect to various embodiments described herein.

The application server 116 is communicatively coupled to a database server 118, which facilitates access to database(s) 120 in which may be stored data associated with the event-based annotation system 122. Data associated with the event-based annotation system 122 can include, without limitation, data describing one or more events identified in content of a media asset, one or more event classification labels identified for events, one or more event subclassification labels identified for events, one or more scenes identified in the content of the media asset, one or more scene attributes for scenes, one or more themes identified in the content of the media asset, and one or more title-level attributes (hereafter, title attributes) for the media asset.

Figure 2:
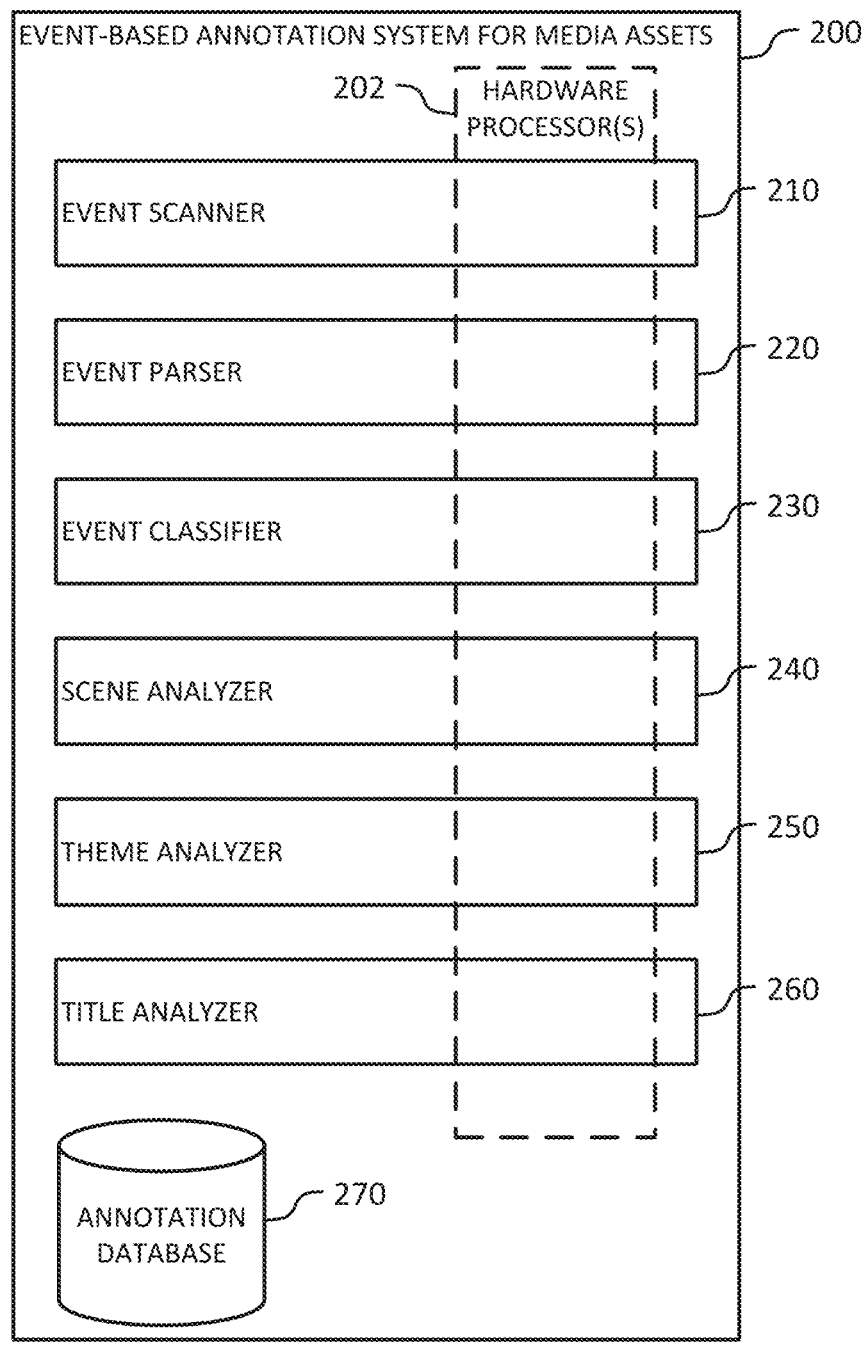
FIG. 2 is a block diagram illustrating an example event-based annotation system for media assets, according to various embodiments of the present disclosure.

FIG. 2 is a block diagram illustrating an example event-based annotation system 200 for media assets, according to various embodiments of the present disclosure. For some embodiments, the event-based annotation system 200 represents an example of the event-based data system 100 described with respect to FIG. 1. As shown, the event-based annotation system 200 comprises an event scanner 210, an event parser 220, an event classifier 230, a scene analyzer 240, a theme analyzer 250, and a title analyzer 260. According to various embodiments, one or more of the event scanner 210, the event parser 220, the event classifier 230, the scene analyzer 240, the theme analyzer 250, and the title analyzer 260 are implemented by one or more hardware processors 202. Data (e.g., contextual data for a media asset) generated by one or more of the event scanner 210, the event parser 220, the event classifier 230, the scene analyzer 240, the theme analyzer 250, and the title analyzer 260 is stored an annotation database (or datastore) 270 of the event-based annotation system 200.

The event scanner 210 is configured to determine (e.g., identify) one or more events within content data of a media asset being annotated by the event-based annotation system 200. For some embodiments, the event scanner 210 determines at least one event (of the one or more events) within the content data by scanning the content data for events that relate to at least one event classification and automatically identifies the at least one event in the content data. Alternatively, or in addition, for some embodiments, the event scanner 210 determines at least one event (of the one or more events) within the content data by receiving one or more user selections of at least one of the one or more events within the content data. For example, a graphical user interface can be displayed at a client device (e.g., 102), where the graphical user interface can enable a user (e.g., human reviewer) at the client device to screen the content data of the media asset (e.g., via a panel or window with a timeline and content player controls). The graphical user interface can include a time bar for the content data of the media asset, where the time bar can include a visual indicator for each timestamp of the media asset that is associated with an identified event or for each range of timestamps for an identified scene. Additionally, the graphical user interface can include a listing of tags that correspond to events or scenes identified in the content data of the media asset. Each tag in the listing of tags can be displayed with one or more event classification labels associated with the event or scene corresponding to the tag. As the user screens the content data through the graphical user interface, the user can submit one or more user inputs to identify an occurrence of an event at a particular timestamp (or timecode), and the one or more user inputs can further identify an event classification label for the identified event. Where a combination of scanning and one or more user inputs are used to determine the one or more events, the scanning can be performed before or after the user inputs. According to various embodiments, the event classification label can be one selected from a plurality of event classification labels defined by a predetermined event classification library, which as described herein can implement a predetermined event classification ontology/taxonomy.

For some embodiments, the event scanner 210 comprises a machine learning model that is trained to automatically determine (e.g., identify) a select event at a select timestamp of a current media asset based on a set of signals provided by at least one computer vision analysis (e.g., video, visual effects, colors, etc.), audio analysis (e.g., speech/dialog, music, background noise), or natural language processing (NLP) of content (e.g., subtitles) presented by the current media asset at the select timestamp. For instance, the event scanner 210 can determine an event with an event classification of violence exists at a select timestamp where: the computer vision analysis determines a knife is present at the select timestamp; an audio analysis determines that an individual is screaming and terrified at the select timestamp; and natural language processing of subtitles can determine that the individual is telling an attacker to back away at the select timestamp. In addition, the machine learning model can be trained to automatically determine (e.g., identify) an event classification label for (e.g., associated with) the select event. Depending on the embodiment, the machine learning model of the event scanner 210 can be trained on data previously generated during annotation of another media asset (e.g., by the event-based annotation system 200), where the generated data describes one or more events (and their event classification labels) identified (e.g., by user input) for the other media asset. Accordingly, events and event classification labels identified by a user (e.g., via user inputs to a graphical user interface at a client device) for content data of a current media asset can eventually be used to train (e.g., initially train or further train) the machine learning model of the event scanner 210.

The event parser 220 is configured to organize (e.g., index) events (determined by the event scanner 210) according to their respective event classification labels to better facilitate determination of one or more event subclassification labels for each event. For instance, the one or more events can be indexed according to the event classification labels of alcohol, blasphemy, cinematography, discrimination, horror, imaginary, LGBTQ, nudity, violence, political extremism, profanity, sex, and violence. Thereafter, events of a given event classification label (e.g., violence) can be processed by the event classifier 230 to identify one or more event subclassification labels (e.g., those associated with the event classification label of violence) using a specific process configured for the given event classification label (e.g., algorithm or trained ML model of the event classifier 230 tailored to subclassify events relating to violence). This can enable the event-based annotation system 200 to better process events in parallel for subclassification.

The event classifier 230 is configured to determine (e.g., identify) one or more event subclassification labels for a given event (determined by the event scanner 210) based on an event classification label associated with the given event. A given event subclassification label determined for a given event can provide detail with respect to a context of the individual event. For instance, with respect to a given event, a given event subclassification label can provide at least one of: a description of the context of the individual event; an explanation of the context of the individual event; how the context of the individual event is presented in the content data of the current media asset; an intent of the context of the individual event; or an outcome of the context of the individual event. According to various embodiments, the event subclassification label can be one selected from a set of event subclassification labels defined, for a given event classification event, by a predetermined event classification library, which as described herein can implement a predetermined event classification ontology/taxonomy.

For some embodiments, the event classifier 230 determines at least one event subclassification label for an event (identified within the content data) by receiving one or more user selections of at least one of the one or more event subclassification labels for the event. For example, a graphical user interface can be displayed at a client device (e.g., 102), where the graphical user interface can enable a user (e.g., human reviewer) at the client device to screen the content data of the media asset (e.g., via a panel or window with a timeline and content player controls). As the user screens the content data through the graphical user interface, the user can submit one or more user inputs to identify an event subclassification label for an event at a particular timestamp.

For some embodiments, the event classifier 230 comprises a machine learning model that is trained to automatically determine (e.g., identify) one or more event subclassification labels for a given event based on a set of signals provided by at least one computer vision analysis, audio analysis, or NLP of content presented by the current media asset at the select timestamp. For instance, the event classifier 230 can determine, for an event with an event classification of violence at a select timestamp: an event subclassification label that indicates weapons use and an event subclassification label that indicates conscious victim in response to the computer vision determining a knife is present at the select timestamp, the audio analysis determining a victim is screaming at the select timestamp, and the natural language processing of subtitles (indicating fighting words between two individuals) at the select timestamp. Depending on the embodiment, the machine learning model of the event classifier 230 can be trained on data previously generated during annotation of another media asset (e.g., by the event-based annotation system 200), where the generated data describes one or more event subclassification labels identified (e.g., by user input) for a given event in the other media asset. Accordingly, event subclassification labels identified by a user (e.g., via user inputs to a graphical user interface at a client device) for a given event of a current media asset can eventually be used to train (e.g., initially train or further train) the machine learning model of the event classifier 230.

The scene analyzer 240 is configured to determine (e.g., identify) one or more scenes within content data of a media asset, where each scene comprises one or more events (e.g., a plurality of events determined by the event scanner 210). Additionally, scene analyzer 240 can be configured to determine (e.g., identify) one or more scene attributes for at least one of the one or more scenes. For various embodiments, a given scene attribute for a given scene can be determined based on events that compose the scene. For instance, one or more scene attributes for a given scene can be based on at least one of: one or more events of the given scene; one or more event classification labels for the one or more events; or one or more event subclassification labels for the one or more events. Examples of scene attributes can include, without limitation: a frequency of events within a given scene; a mixture of events of different event classification labels within the given scene; a distance between two events within the given scene; a duration of the given scene; whether the scene is direct, explicit, implied; and an aftermath.

For some embodiments, the scene analyzer 240 determines (e.g., identifies) at least one scene within the content data, at least one scene attribute, or both by receiving one or more user selections of at least one scene or scene attribute. Depending on the embodiment, the user selections can be received as part of, or separate from, user selections used to identify events (and event classification labels thereof). For example, a graphical user interface can be displayed at a client device (e.g., 102), where the graphical user interface can enable a user (e.g., human reviewer) at the client device to screen the content data of the media asset (e.g., via a panel or window with a timeline and content player controls). As the user screens the content data through the graphical user interface, the user can submit one or more user inputs to identify a start of a scene at a first timestamp and an end of the scene at a second timestamp, where the scene would comprise all the events having timestamps that fall within the range of timestamps (from the first timestamp to the second timestamp).

For some embodiments, the scene analyzer 240 comprises a machine learning model that is trained to automatically determine (e.g., identify) a select scene starting at a first timestamp and ending at a second timestamp of a current media asset based on a set of signals provided by at least one computer vision analysis, audio analysis, or NLP of content presented by the current media asset at the select timestamp. Depending on the embodiment, the machine learning model of the scene analyzer 240 can be trained on data previously generated during annotation of another media asset (e.g., by the event-based annotation system 200), where the generated data describes one or more scenes identified (e.g., by user input) for the other media asset. Accordingly, scenes identified by a user (e.g., via user inputs to a graphical user interface at a client device) for content data of a current media asset can eventually be used to train (e.g., initially train or further train) the machine learning model of the scene analyzer 240.

The theme analyzer 250 is configured to determine (e.g., identify) one or more themes of a media asset based on at least one or more scenes or one or more scene attributes (determined by the scene analyzer 240). For various embodiments, a given theme can be determined based on at least one of the set of scenes or the set of scene attributes. Examples of themes can include, without limitation, theme type (e.g., coming of age context, good versus evil context, etc.), and attributes that explain dimensions of the theme (e.g., does the theme involve the main character, is the theme imitable, is the theme reproducible). For some embodiments, the theme analyzer 250 determines (e.g., identifies) at least one theme for the media asset by receiving one or more user selections of the at least one theme. For example, a graphical user interface can be displayed at a client device (e.g., 102), where the graphical user interface can enable a user (e.g., human reviewer) at the client device to identify one or more themes for the media asset.

For some embodiments, the theme analyzer 250 comprises a machine learning model that is trained to automatically determine (e.g., identify) a select theme for the media asset based on at least one scene or at least one scene attribute. Depending on the embodiment, the machine learning model of the theme analyzer 250 can be trained on data previously generated during annotation of another media asset (e.g., by the event-based annotation system 200), where the generated data describes one or more themes identified (e.g., by user input) for the other media asset. Accordingly, themes identified by a user (e.g., via user inputs to a graphical user interface at a client device) for content data of a current media asset can eventually be used to train (e.g., initially train or further train) the machine learning model of the theme analyzer 250.

The title analyzer 260 is configured to determine (e.g., identify) one or more title attributes for a media asset based on at least one or more themes (determined by the theme analyzer 250) and metadata associated with the media asset. Examples of title attributes can include, without limitation, genre, time context (e.g., historical, present-day, etc.), and type of title (e.g., scripted, reality-based, live, talk-show, animated, etc.). Depending on the embodiment, the metadata can comprise at least one of: an attribute describing a genre of the media asset; an attribute describing how the content data of the media asset is presented; an attribute describing a cast or a crew member listed for the media asset; an attribute describing entities involved in production of the media asset; an attribute describing a production or release date for the media asset; or a runtime of the media asset. For some embodiments, the title analyzer 260 determines (e.g., identifies) at least one title attribute for the media asset by receiving one or more user selections of the at least one title attribute. For example, a graphical user interface can be displayed at a client device (e.g., 102), where the graphical user interface can enable a user (e.g., human reviewer) at the client device to identify one or more title attributes for the media asset.

Figure 3:
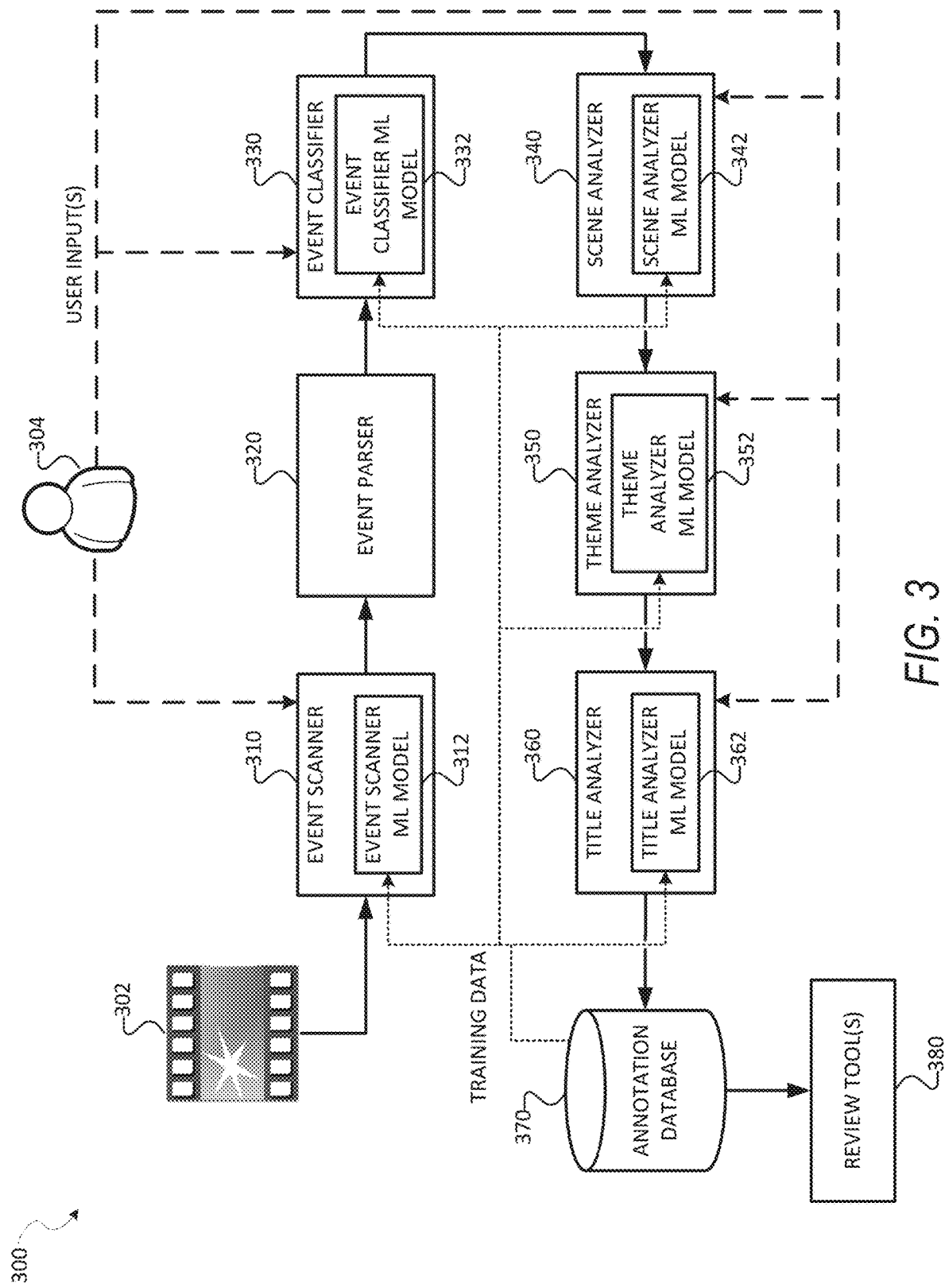
FIG. 3 is a flowchart illustrating data flow within an example event-based annotation system for media assets during operation, according to various embodiments of the present disclosure.

FIG. 3 is a flowchart illustrating data flow within an example event-based annotation system 300 for media assets during operation, according to various embodiments of the present disclosure. As shown, the event-based annotation system 300 comprises an event scanner 310, an event parser 320, an event classifier 330, a scene analyzer 340, a theme analyzer 350, a title analyzer 360, and an annotation database 370. For some embodiments, the event scanner 310, the event parser 320, the event classifier 330, the scene analyzer 340, the theme analyzer 350, and the title analyzer 360 are respectively similar to the event scanner 210, the event parser 220, the event classifier 230, the scene analyzer 240, the theme analyzer 250, and the title analyzer 260 of the event-based annotation system 200 of FIG. 2. Additionally, each of the event scanner 310, the event classifier 330, the scene analyzer 340, the theme analyzer 350, and the title analyzer 360 can comprise a machine learning (ML) model (e.g., 312, 332, 342, 352, 362) that enables or facilitates operation as described herein.

During operation, a media asset 302 (e.g., video media asset) is received and processed by the event scanner 310, which determines (e.g., identifies) a set of events for the video media asset 302 and determines a set of event classification labels (e.g., selected from a predetermined event classification library) for the set of events. One or more events in the set of events are determined (e.g., identified) by one or more user inputs from a user 304 (e.g., through a graphical user interface at a client device), an event scanner machine learning (ML) model 312 of the event scanner 310, or some combination of both. For some embodiments, the event scanner ML model 312 can be configured (e.g., trained) to automatically determine events (at select timestamps of the media asset 302) and their respective event classification labels based on a set of signals provided by at least one computer vision analysis (e.g., video, visual effects, colors, etc.), audio analysis (e.g., speech/dialog, music, background noise), or NLP of content (e.g., subtitles) presented by the media asset 302 at the select timestamps. The event scanner ML model 312 can be trained based on training data provided by the annotation database 370, which can store data describing events and respective event classification labels determined (e.g., identified) for timestamps of another media asset (e.g., one that was previously annotated by the event-based annotation system 300).

The event parser 320 parses one or more events determined (e.g., identified) by the event scanner 310, and organizes (e.g., indexes) the one or more events according to their respective event classification labels (determined by the event scanner 310) to better facilitate determination of one or more event subclassification labels for each event. As described herein, the one or more events can be indexed according to the event classification labels, such as alcohol, blasphemy, cinematography, discrimination, horror, imaginary, LGBTQ, nudity, violence, political extremism, profanity, sex, and violence. By parsing (e.g., indexing) the events in this manner, events of a given event classification label (e.g., violence) can be processed subsequently by the event classifier 330 to identify one or more event subclassification labels using a specific process configured for the given event classification label (e.g., algorithm or trained ML model of the event classifier 330 tailored to subclassify events relating to violence).

The event classifier 330 determines (e.g., identifies) one or more event subclassification labels for each event determined by the event scanner 310, and performs this determination based on the respective event classification label of each event (as determined by the event scanner 310). One or more event subclassification labels are determined (e.g., identified) by one or more user inputs from the user 304, an event classifier machine learning (ML) model 332 of the event classifier 330, or some combination of both. For some embodiments, the event classifier ML model 332 can be configured (e.g., trained) to automatically determine event subclassification labels for a given event based on their respective event classification labels (which determine a set of available event subclassification labels to select from) and a set of signals provided by at least one computer vision analysis (e.g., video, visual effects, colors, etc.), audio analysis (e.g., speech/dialog, music, background noise), or NLP of content (e.g., subtitles) presented by the media asset 302 at a select timestamp of the given event. The event classifier ML model 332 can be trained based on training data provided by the annotation database 370, which can store data describing events and respective event subclassification labels determined (e.g., identified) for timestamps of another media asset (e.g., one that was previously annotated by the event-based annotation system 300).

The scene analyzer 340 determines (e.g., identifies) one or more scenes in content of the media asset 302 and scene attributes of the one or more scenes, where each scene spans a time duration from a start timestamp to an end timestamp and each scene comprises one or more events (determined by the event scanner 310) that have timestamps fallings within that time duration. One or more scenes (or one or more scene attributes thereof) are determined (e.g., identified) by one or more user inputs from the user 304, a scene analyzer machine learning (ML) model 342 of the scene analyzer 340, or some combination of both. For some embodiments, the scene analyzer ML model 342 can be configured (e.g., trained) to automatically determine scenes in content of the media asset 302 (or scene attributes of the scenes) based on events that have occurred in the content over a given time duration or a set of signals provided by at least one computer vision analysis (e.g., video, visual effects, colors, etc.), audio analysis (e.g., speech/dialog, music, background noise), or NLP of content (e.g., subtitles) presented by the media asset 302 over the given time duration. The scene analyzer ML model 342 can be trained based on training data provided by the annotation database 370, which can store data describing scenes, events thereof, or scene attributes thereof determined (e.g., identified) for another media asset (e.g., one that was previously annotated by the event-based annotation system 300).

The theme analyzer 350 determines (e.g., identifies) one or more themes for the media asset 302 based on at least one or more scenes or one or more scene attributes (determined by the scene analyzer 340). One or more themes are determined (e.g., identified) by one or more user inputs from the user 304, a theme analyzer machine learning (ML) model 352 of the theme analyzer 350, or some combination of both. For some embodiments, the theme analyzer ML model 352 can be configured (e.g., trained) to automatically determine themes of the media asset 302 based on scenes that have occurred in the content, scene attributes of those scenes, or a set of signals provided by at least one computer vision analysis (e.g., video, visual effects, colors, etc.), audio analysis (e.g., speech/dialog, music, background noise), or NLP of content (e.g., subtitles) presented by the media asset 302. The theme analyzer ML model 352 can be trained based on training data provided by the annotation database 370, which can store data describing themes determined (e.g., identified) for another media asset (e.g., one that was previously annotated by the event-based annotation system 300).

The title analyzer 360 determines (e.g., identifies) one or more title attributes for the media asset 302 based on at least one or more themes (determined by the theme analyzer 350) and metadata associated with the media asset. One or more title attributes are determined (e.g., identified) by one or more user inputs from the user 304, a title analyzer machine learning (ML) model 362 of the title analyzer 360, or some combination of both. For some embodiments, the title analyzer ML model 362 can be configured (e.g., trained) to automatically determine title attributes of the media asset 302 based on themes of the media asset 302 and metadata of the media asset 302, or a set of signals provided by at least one computer vision analysis (e.g., video, visual effects, colors, etc.), audio analysis (e.g., speech/dialog, music, background noise), or NLP of content (e.g., subtitles) presented by the media asset 302. The title analyzer ML model 362 can be trained based on training data provided by the annotation database 370, which can store data describing title attributes determined (e.g., identified) for another media asset (e.g., one that was previously annotated by the event-based annotation system 300).

Eventually, contextual data for the media asset 302 is generated and stored on the annotation database 370. For some embodiments, the contextual data is generated based on one or more of the following: the one or more events (and associated timestamps) determined by the event scanner 310; the event classification labels determined by the event scanner 310 for the one or more events; the one or more event subclassification labels determined by the event classifier 330 for the one or more events; the set of scenes determined by the scene analyzer 340; the one or more scene attributes determined by the scene analyzer 340 for the one or more scenes; the one or more themes determined by the theme analyzer 350; or the one or more title attributes determined by the title analyzer 360. This contextual data stored for the media asset 302 on the annotation database 370 can be subsequently used by one or more review tools 380 for further analysis of the media asset 302. For example, using the stored contextual data, the review tools 380 can analyze the media asset 302 to: predict a rating for the media asset 302 in one or more target cultures, countries, regions, and the like; classify content of the media asset 302 for one or more cultures, countries, regions, and the like; generate content advisory for the media asset 302; generate a trailer for the media asset 302; perform compliance review on the media asset 302; determine audience segments for the media asset 302; target the media asset 302 for an audience; enable skipping of scenes in the media asset 302; filter content of the media asset 302; or predict cultural appeal or aversion of the media asset 302 with respect to specified culture, country, region, or the like. As described herein, the process can represent a downstream analysis of the media asset 302.

Figure 4:
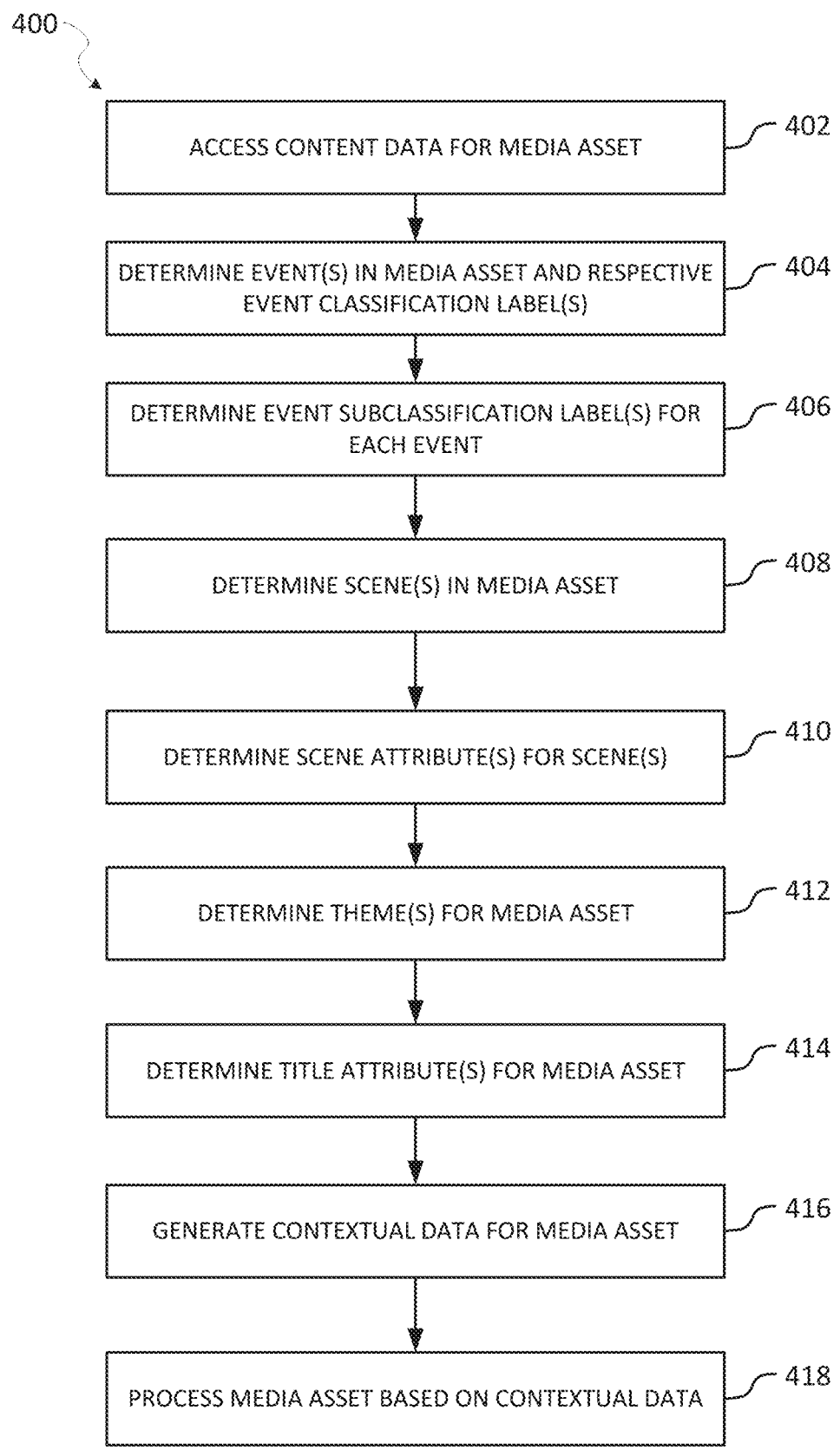
FIG. 4 is a flowchart illustrating an example method for event-based annotating of media assets, according to various embodiments of the present disclosure.

FIG. 4 is a flowchart illustrating an example method 400 for event-based annotating media assets, according to various embodiments of the present disclosure. It will be understood that example methods described herein may be performed by a machine in accordance with some embodiments. For example, the methods 400 can be performed by the event-based annotation system 122 described with respect to FIG. 1, the event-based annotation system 200 described with respect to FIG. 2, the event-based annotation system described with respect to FIG. 3, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of the method 400 may be represented by executable instructions that, when executed by a processor of a computing device, cause the computing device to perform the method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 402, content data for a media asset is accessed by (e.g., using) a hardware processor (e.g., hardware process operating the event-based annotation system 200). The media asset accessed can be one selected for analysis or review (e.g., media asset review). For instance, the media asset can be selected by a user at a client device, such as by way of one or more user inputs to a graphical user interface presented by a standalone software application a web browser software application. As described herein, examples of a media asset can include, without limitation, audio assets (e.g., music tracks, music albums, etc.) and video assets (e.g., motion pictures, feature films, television episodes, etc.). Depending on the embodiment, the content data can be provided by a media file or datastore associated with the media asset.

The method 400 continues with operation 404, where one or more events within the content data (of the media asset) are determined (e.g., identified) by the hardware processor, and respective event classifications labels for the one or more events is also determined by the hardware processor. For some embodiments, operation 404 is performed, at least in part, by the event scanner 210 described with respect to FIG. 2. Additionally, depending on the embodiment, operation 404 can comprise receiving one or more user inputs (e.g., through a graphical user interface such as the one illustrated by FIG. 7) that identify at least one event within the content data and the event's respective event classification label, a trained machine learning model (e.g., machine learning model 312 of the event scanner 310) that identifies at least one event within the content data and the event's respective event classification label, or some combination of both (e.g., user inputs identify some the one or more events within, and the remainder of the one or more events are identified by the trained machine learning model). According some embodiments, operation 404 is performed by scanning the content data for events (e.g., emotional events), which can relate to one or more one event classifications (e.g., alcohol, blasphemy, cinematography, discrimination, horror, imaginary, LGBTQ, nudity, violence, political extremism, profanity, sex, and violence) defined by a predetermined event classification ontology or taxonomy. According to various embodiments, each event of the one or more events comprises at least one of a visual content element, a textual content feature, or an audio content feature from the content data (of the media asset) that is presented at a timestamp of the media asset. The predetermined event classification ontology/taxonomy used by some embodiments defines a plurality of event classification, where each particular event classification comprises one or more subclassifications relating to the particular event classification. Depending on the embodiments, the one or more subclassifications associated with an individual event classification can be organized in a hierarchy of subclassifications (e.g., at a top level event subclassifications for the event classification of violence can comprise physical, non-physical, sexual, and a different set of event subclassifications under each of the physical, non-physical, and sexual event subclassifications).

As described herein, the predetermined event classification ontology/taxonomy of various embodiments is defined (e.g., configured or designed) in such a way as to facilitate or enable a process for annotating described herein to extract contextual information regarding content presented by a given media asset, while reducing or removing cultural bias from the contextual information extraction. This permits various embodiments to provide baseline information regarding content of a given media asset prior to cultural biases (e.g., those of a specific people, community, culture, region, country, etc.) being considered (e.g., applied) in downstream analysis of the given media asset (e.g., subsequent analysis for: predicting rating, content classification, generating content advisory, generating trailer, performing compliance review, audience segmentation or targeting, scene skipping, content filtering, predicting cultural appeal or aversion of the media asset, and the like). As described herein, the cultural bias that is effectively being reduced or removed from the contextual information extraction process can be: that of the one or more individuals (e.g., director, screenwriter, actors, and other cast members) who helped create the content within a media asset; that of a human reviewer that is annotating the media asset; or that of an audience member who will eventually observe the media asset. The predetermined event classification ontology/taxonomy can represent expert knowledge data that is captured (e.g., by human reviewers or by automated processes) over time, and can be updated from time to time (e.g., periodically) based on changes observed in the world (e.g., cultural changes, changes in government regulation or policy, changes in rating systems, recent events, or the like, which can result in an addition or a modification to the predetermined event classification ontology/taxonomy).

According to various embodiments, each event determined (e.g., identified) by operation 404 is associated with an event classification label (e.g., nudity) selected from a predetermined event classification library, where the predetermined event classification library can be configured such that event classification labels and event subclassification labels of the predetermined event classification library cause events in the current media asset to be classified without cultural bias. For instance, the predetermined event classification library can implement a predetermined ontology/taxonomy described herein, where an event classification label determined for a given event can represent an event classification (e.g., alcohol, blasphemy, cinematography, discrimination, horror, imaginary, LGBTQ, nudity, violence, political extremism, profanity, sex, and violence) from the predetermined ontology/taxonomy. The predetermined event classification library can comprise a plurality of event classification labels that correspond to different event classifications of the predetermined ontology/taxonomy, and each individual event classification label can comprise a set of available event subclassification labels that correspond to different event subclassifications (e.g., male or female; partial, veiled, full, or closeup; front, side, back, or rear; animated, pixelated, realistic, artistic, cultural, or scientific; etc.) associated with (e.g., defined for) the individual classification (e.g., nudity) in accordance with the predetermined ontology/taxonomy.

At operation 406, one or more event subclassification labels are determined (e.g., identified), by the hardware processor, for each given event determined at operation 404. As described herein, a given event subclassification label determined for a given event can provide detail with respect to a context of the individual event. For instance, with respect to a given event, a given event subclassification label can provide at least one of: a description of the context of the individual event; an explanation of the context of the individual event; how the context of the individual event is presented in the content data of the current media asset; an intent of the context of the individual event; or an outcome of the context of the individual event.

For some embodiments, operation 406 is performed, at least in part, by the event classifier 230 described with respect to FIG. 2. Additionally, depending on the embodiment, operation 406 can comprise receiving one or more user inputs (e.g., through a graphical user interface such as the one illustrated by FIG. 7) that identify at least one event subclassification label for an event (determined at operation 404), a trained machine learning model (e.g., machine learning model 312 of the event scanner 310) that identifies at least one event subclassification label for an event (determined at operation 404), or some combination of both (e.g., user inputs identify some event subclassification labels for one or more events, and the remainder of event subclassification labels for one or more events are identified by the trained machine learning model). As described herein, the one or more event subclassification labels determined for the given event can be selected from a set of available subclassification labels for the event classification (determined by operation 404) for the given event. According to some embodiments, the predetermined event classification library provides the set of available subclassification labels (for the event classification) from which the one or more event subclassification labels are selected for a given event.

Prior to operation 406 being performed, the one or more events determined by operation 404 can be organized (e.g., indexed) according to their respective event classification labels (as determined by operation 404) to better facilitate determination of one or more event subclassification labels for each event. For instance, the one or more events can be indexed according to the event classification labels of alcohol, blasphemy, cinematography, discrimination, horror, imaginary, LGBTQ, nudity, violence, political extremism, profanity, sex, and violence. Thereafter, events of a given event classification label (e.g., violence) can be processed for identification of one or more event subclassification labels (e.g., those associated with the event classification label of violence) by a specific process configured for the given event classification label (e.g., algorithm or trained ML model tailored to subclassify event's relating to violence). For some embodiments, the organization (e.g., indexing) of the one or more events is performed, at least in part, by the event parser 220 described with respect to FIG. 2.

At operation 408, one or more scenes within the content data (of the media asset) are determined (e.g., identified), by the hardware processor, where each scene comprises one or more events (e.g., a plurality of events) determined at operation 404. For some embodiments, operation 408 is performed, at least in part, by the scene analyzer 240 described with respect to FIG. 2.

At operation 410, one or more scene attributes are determined, by the hardware processor, for each scene determined at operation 408. For some embodiments, operation 410 is performed, at least in part, by the scene analyzer 240 described with respect to FIG. 2. According to some embodiments, the one or more scene attributes determined for a given scene are based on one or more events included by the given scene. For instance, one or more scene attributes for a given scene can be based on at least one of: one or more events of the given scene; one or more event classification labels for the one or more events; or one or more event subclassification labels for the one or more events. As described herein, examples of scene attributes can include, without limitation: a frequency of events within a given scene; a mix of events of different event classification labels within the given scene; a distance between two events within the given scene; a duration of the given scene; and attributes that explain dimensions of a scene (e.g., whether the scene is direct, explicit, implied, and an aftermath).

Based on at least one or more scenes (determined at operation 408) or one or more scene attributes (determined at operation 410), at operation 412, one or more themes are determined for the media asset by the hardware process. For some embodiments, operation 412 is performed, at least in part, by the theme analyzer 250 described with respect to FIG. 2. As described herein, examples of themes can include, without limitation, theme type (e.g., coming of age context, good versus evil context, etc.), and attributes that explain dimensions of the theme (e.g., does the theme involve the main character, is the theme imitable, is the theme reproducible). At least one theme for the media asset can be determined by receiving one or more user selections (e.g., via graphical user interface) of the at least one theme.

At operation 414, based on at least the set of themes (determined at operation 412) and metadata associated with the media asset, one or more title attributes are determined for the media asset by the hardware process. As described herein, examples of title attributes can include, without limitation, genre, time context (e.g., historical, present-day, etc.), and type of title (e.g., scripted, reality-based, live, talk-show, animated, etc.). Additionally, the metadata can comprise at least one of: an attribute describing a genre of the media asset; an attribute describing how the content data of the media asset is presented; an attribute describing a cast or a crew member listed for the media asset; an attribute describing entities involved in production of the media asset; an attribute describing when a production or release date for the media asset; or a runtime of the media asset.

At operation 416, contextual data (describing contextual information) for the media asset is generated, by the hardware processor, based on at least one of: the one or more events determined at operation 404; the event classification labels determined at operation 404 for the one or more events; the one or more event subclassification labels determined (for the one or more events) at operation 406; the set of scenes determined at operation 408; the one or more scene attributes determined (for the one or more scenes) at operation 410; the one or more themes determined at operation 412; or the one or more title attributes determined at operation 414.

Eventually, at operation 418, a process (e.g., analysis process) is performed (or caused to be performed) on the media asset based on the contextual data generated at operation 416. For instance, the process performed on the media asset can include one or more of the following: predicting a rating for the media asset in one or more target cultures, countries, regions, and the like; content classification of the media asset for one or more cultures, countries, regions, and the like; generating content advisory for the media asset; generating a trailer for the media asset; performing compliance review on the media asset; determining audience segments for the media asset; targeting the media asset for an audience; enabling skipping of scenes in the media asset; filtering content of the media asset; or predicting cultural appeal or aversion of the media asset.

Though not illustrated, the method 400 can include an operation where a graphical user interface for screening the media asset can be displayed (or caused to be displayed) by the hardware processor. For instance, the operation can cause a client device (e.g., the client device 102 communicatively coupled to the event-based annotation system 122) to display the graphical user interface for screening the media asset. This operation for displaying the graphical user interface can be separate from operations 402 through 418 or, alternatively, form part of one or more of operations 402 through 418. Depending on the embodiment, the graphical user interface can be configured to receive one or more user inputs that identify at least one of: one or more events in the content data of the media asset; one or more event classification labels for an event of the current media asset; one or more event subclassification labels for an event of the current media; one or more scenes in the content data of the current media asset; one or more themes for the current media asset; or one or more title attributes for the current media asset.

Figure 5A:
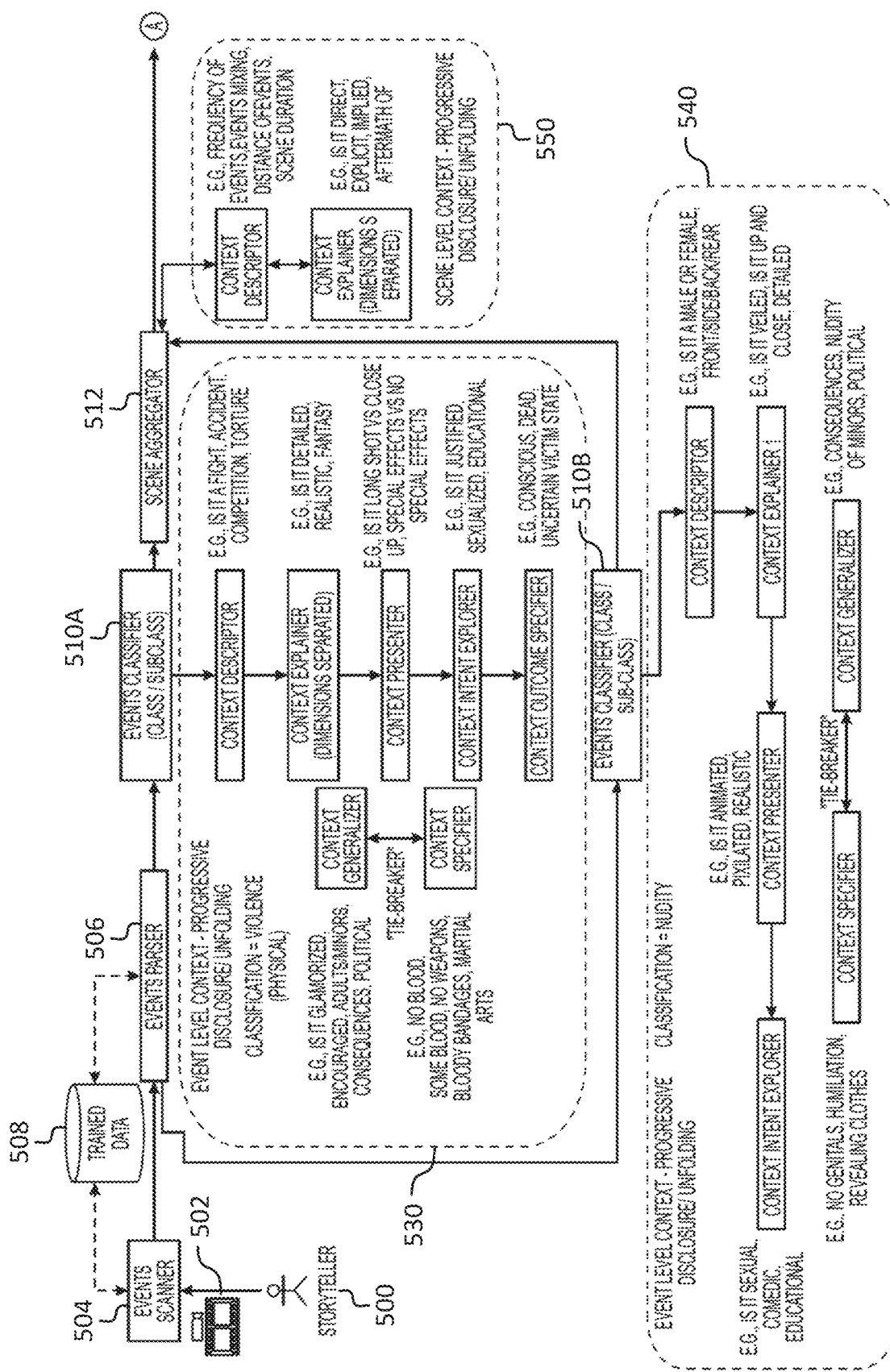
FIGS. 5A-5B provide a flowchart illustrating an example event-based annotation system and operation of the system, according to various embodiments of the present disclosure.
Figure 5B:
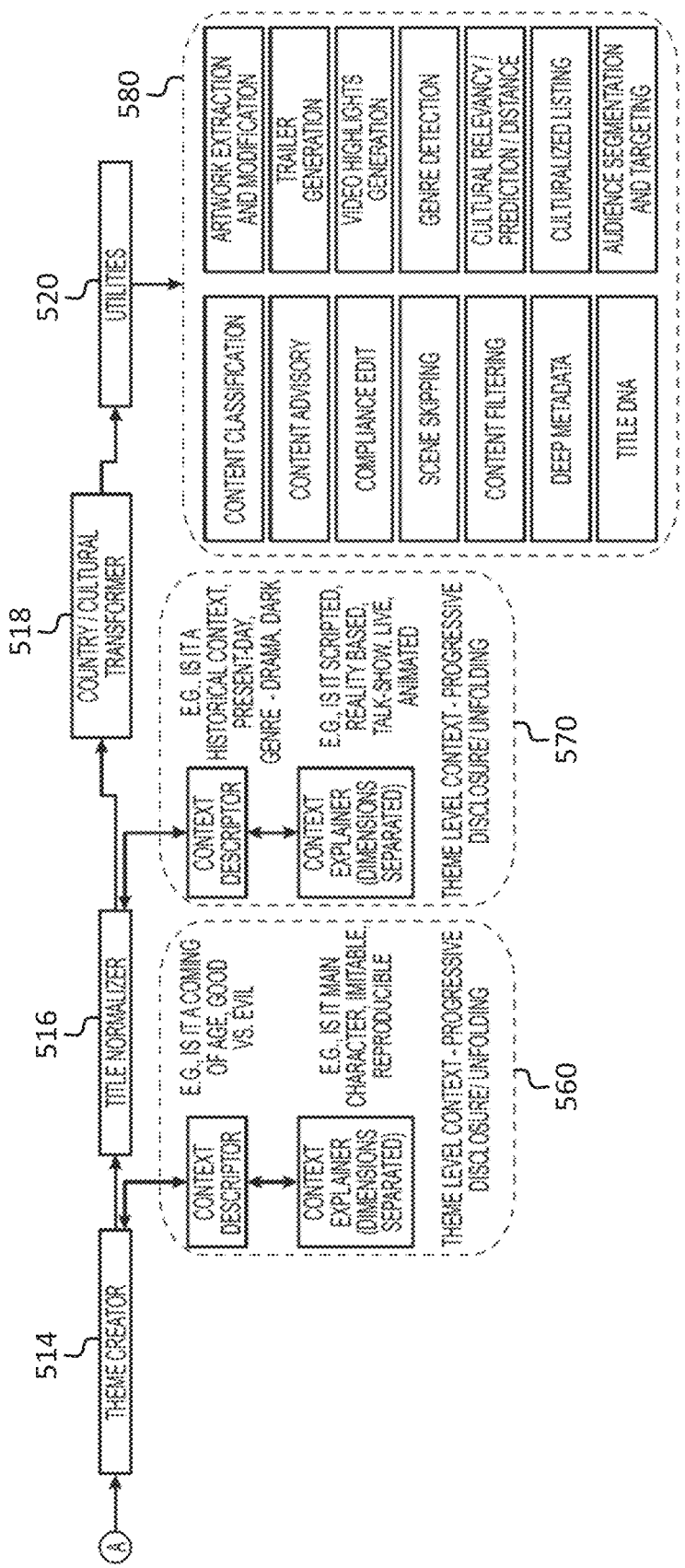

FIGS. 5A-5B provide a flowchart illustrating an example event-based annotation system and operation of the system, according to various embodiments of the present disclosure. In FIG. 5A, a storyteller 500 represents one or more individuals responsible for creating a media asset 502, where the storyteller 500 possesses her/his cultural biases. An events scanner 504 processes the media asset 502 to determine a set of events, associated event classification labels, and a set of scenes (where each scene comprises one or more events) for the media asset 502, and an events parser 506 processes the set of events to organize (e.g., index) them according to their respective event classification labels. Operation(s) of either the events scanner 504, the events parser 506, or both are trained based on trained data 508. An events classifier 510A processes a first subset of events, of the organized set of events, associated with an event classification label of 'violence—physical' (rather than 'violence—non-physical' or 'violence—sexual') to assign a set of event subclassification labels relating to 'violence—physical' for each event in the first subset of events. As shown (530), with respect to a 'violence—physical' event, the events classifier 510A can provide: a context descriptor (e.g., is the event a fight, an accident, a competition, or torture); a context explainer (e.g., is the event detailed, realistic, fantasy); a context presenter (e.g., is the event presented as a long shot or a close up, special effects or no special effects); a context intent explorer (e.g., is the event justified, sexualized, educational); a context outcome specifier (e.g., is a victim of violence in the event conscious, dead, uncertain victim state); a context generalizer (e.g., is the event glamorized, encouraged, involve adults and minors, involve consequences, political); and a context specifier (e.g., the event involves blood, some blood, no weapons, bloody bandages, involves martial arts).

In parallel, an events classifier 510B processes a second subset of events, of the organized set of events, associated with an event classification label of 'nudity' to assign a set of event subclassification labels relating to 'nudity' for each event in the second subset of events. As shown (540), with respect to a 'nudity' event, the events classifier 510B can provide: a context descriptor (e.g., does the event involve a male or female, or display front, side, back, or rear nudity); a context explainer (e.g., is the nudity veiled, up close, detailed); a context presenter (e.g., is the event presented as animation, pixilated, or realistic); a context intent explorer (e.g., is the event sexual, comedic, educational); a context generalizer (e.g., does the event involve consequences, nudity of minor, political); and a context specifier (e.g., the event displays no genitals, humiliation, revealing clothes).

A scene aggregator 512 processes the set of scenes of the media asset 502, and determines a set of scene attributes for each scene. As shown (550), with respect to each scene, the scene aggregator 512 provides one or more of the following scene attributes: a context descriptor (e.g., frequency of events within the scene, mix of events within the scene, distance of events within the scene, time duration of the scene); and a context explainer (e.g., is the scene direct, explicit, implied, or an aftermath of another scene).

A theme creator 514 processes the set of scenes and the set of scene attributes, and determines a set of themes for the media asset 502. As shown (560), the theme creator 514 provides one or more of the following regarding a theme of a scene: a context descriptor (e.g., does the scene present a coming of age theme, good versus evil); and a context explainer (e.g., does the scene involve the main character, an imitable theme, a reproducible theme).

A title normalizer 516 processes metadata of the media asset 502 and the set of themes to determine a set of title attributes. As shown (570), the theme creator 514 provides one or more of the following title attributes with respect to the media asset 502: a context descriptor (e.g., is the media asset 502 a historical piece, a present-day piece, a dark drama); and a context explainer (e.g., is the media asset 502 scripted, reality based, talk-show, live, animated).

By processing the media asset 502, the events scanner 504, the events parser 506, the events classifiers 510A, 510B, the scene aggregator 512, and the theme creator 514, the title normalizer 516 can generate contextual information for the media asset 502. Based on the generated contextual information, a country/cultural transformer 518 can generate transformed information with respect to a target country or culture, where the transformed information can be used by one or more utilities 520 to further analyze the media asset 502.

For instance, as shown (580), the utilities 520 can perform (with respect to the media asset 502) content classification, artwork extraction and modification, content advisory generation, trailer generation, compliance editing, video highlight generation, scene skipping, genre detection, content filtering, cultural relevancy/prediction/distance calculation, deep metadata analysis, culturalized (culture-based) listing generation, title "DNA" analysis, audience segmentation and targeting, or dynamic advertising slot (or break) generation. Depending on the embodiment, content classification can comprise an automated method in which technology is used to screen content of the media asset 502 and automatically generate rating values for the media asset 502 for local markets worldwide. In general, content classification involves screening a film or television show for elements, such as violence, sexuality, or drugs, to determine its suitability for viewers by age group in a specific local market. Age ratings, also known as maturity ratings, can provide the public with the information they need to make informed viewing decisions, as well as protect children from viewing content that may be harmful to them.

Artwork extraction and modification can comprise an automated method in which artwork is extracted from content of the media asset 502, where the artwork selected for extraction is relevant for a promotional utility (e.g., for enhanced click-through rates for the media asset 502 on an digital store that presents the artwork in connection with the media asset 502). In general, media content artwork can comprise a digital poster that is used to promote and advertise content and that is designed to persuade viewers to select content of a media asset.

Content advisory generation can comprise an automated method in which technology is used to generate local content advisories for the media asset 502 accurately and consistently. In general, content advisories, also known as content warnings, can provide detailed information about the types of objectionable content contained in film and television, such as violence, profanity, or drugs.

Trailer generation can comprise an automated method in which a trailer is generated using artificial intelligence and machine learning technology that indexes and packages the most relevant scenes of content of the media asset 502. In general, a trailer can comprise a commercial advertisement of a video content that is planned for exhibition—usually for films and television shows.

Compliance editing can comprise an automated method in which technology is used to recommend the respective time-code ranges of non-compliant scenes within the media asset 502 for local markets worldwide. In general, content exhibition in local markets can be regulated to ensure compliance with content classification and censorship laws. When a particular content fails to comply with local policies, regulators can require that objectionable scenes be edited accordingly.

Video highlight generation can comprise an automated method for indexing the most relevant scenes of video content of the media asset 502 and generating one or more short video clips from these scenes such that the short video clips appeal to one or more cultural sensitivities or a value system of a local audience (e.g., for the purpose of marketing and promoting the content of the media asset 502).

Scene skipping can comprise an automated method in which time-based markers (e.g., time-code ranges) of the media asset 502 that represent the duration of the objectionable scene are captured and provided to a video/streaming platform, which can enable a feature "Skip Scene" (e.g., a graphical user interface button on the client interface that a viewer can click to skip an objectionable scene).

Genre detection can comprise an automated method for detecting a genre of content of the media asset 502, which can be used for dynamic listing or content promotion/recommendation activities for the media asset 502. In general, genres and sub-genres for media content are categories that define the content based on one or more of its narrative themes.

Content filtering can comprise an automated method in which content (e.g., such as the content of the media asset 502) is suggested a particular viewer at a given time. In general, the filtered content can be displayed in the catalog (e.g., virtual shelves and trays) of a digital streaming platform to persuade a viewer to watch the content.

Cultural relevancy/prediction/distance calculation can comprise an automated method in which a cultural distance is measured between two or more cultures for the purposes of adapting content of the media asset 502 to improve its appeal (e.g., relatability or suitability) with respect to a local audience or to predict its appeal (e.g., relatability or suitability) with respect to the local audience, which can determine the overall success of the media asset 502 in connection with that local audience. The method can consider local laws, customs, or tastes and preferences of the viewing audience in measuring this distance.

Deep metadata analysis can comprise an automated method in which technology is used to generate, for content of the media asset 502, attributes at relevant time-code ranges that describe the content's mood, theme, time period, location, event, objectionable content, character, or another element that is important for enhanced search and discovery. In general, deep metadata regarding content of a media asset can provide definitions that organize content to make it more visible for search engines and streaming platforms.

Culturalized (culture-based) listing generation can comprise an automated method in which a listing of media assets (and the content of each listing element, such as title metadata, artwork, trailer, etc.) is generated based on localization and culturalization. In general, localization can comprise adapting content to a viewer's geographical environment in accordance with language, legal and technology requirements, while culturalization can comprise adapting content of the media asset 502 to a viewer's cultural environment (e.g., viewer's beliefs, values and customs).

Title "DNA" analysis can comprise an automated method for generating a core set of instructions that dictate the essence of the content of the media asset 502, which can be used to modify or generate (the context or structure for) title metadata of the media asset 502. In general, title metadata for a media asset can be used to organize, index, analyze, manage, and service the media asset for enhanced distribution and consumption.

Audience segmentation and targeting can comprise an automated method in which consumers can be profiled according to demographics, psychographics, gender, age, ethnicity, or other parameters, and consumers within a target audience or cohort can be identified (e.g., for enhanced marketing promotions and conversions) for the media asset 502.

Dynamic advertising slot (or break) generation can comprise an automated method in which a scene graph for the media asset 502 is generated, where the scene graph can provide details on emotional highs and lows in content (e.g., video content) of the media asset 502 and create time-based markers (aka time-code ranges) corresponding to the peak emotional events in the content of the media asset 502. The time-based markers, along with other deep metadata, can be provided to a video/streaming platform for optimal placement of advertisements for the media asset 502. Dynamic advertising slot/break generation can ensure that advertisements are placed dynamically in content of a media asset at moments that would incur the greatest impact.

FIG. 6 illustrates an example graphical user interface 600 for metadata for a media asset, according to various embodiments of the present disclosure. For some embodiments, the graphical user interface 600 is be displayed on a client device and enables a user to enter or modify metadata for a media asset. As shown, metadata that can be entered or modified by the graphical user interface 600 includes a release date (602) of a media asset, a runtime (604) of the media asset, a US rating (606) for the media asset by a rating agency, a US content advisory (608) for the media asset, one or more writers (610) involved in creating the media asset, one or more directors (612) involved in creating the media asset, one or more producers (614) involved in creating the media asset, a production company (616) involved in creating the media asset, and one or more cast members (618) involved in creating the media asset.

Figure 7:
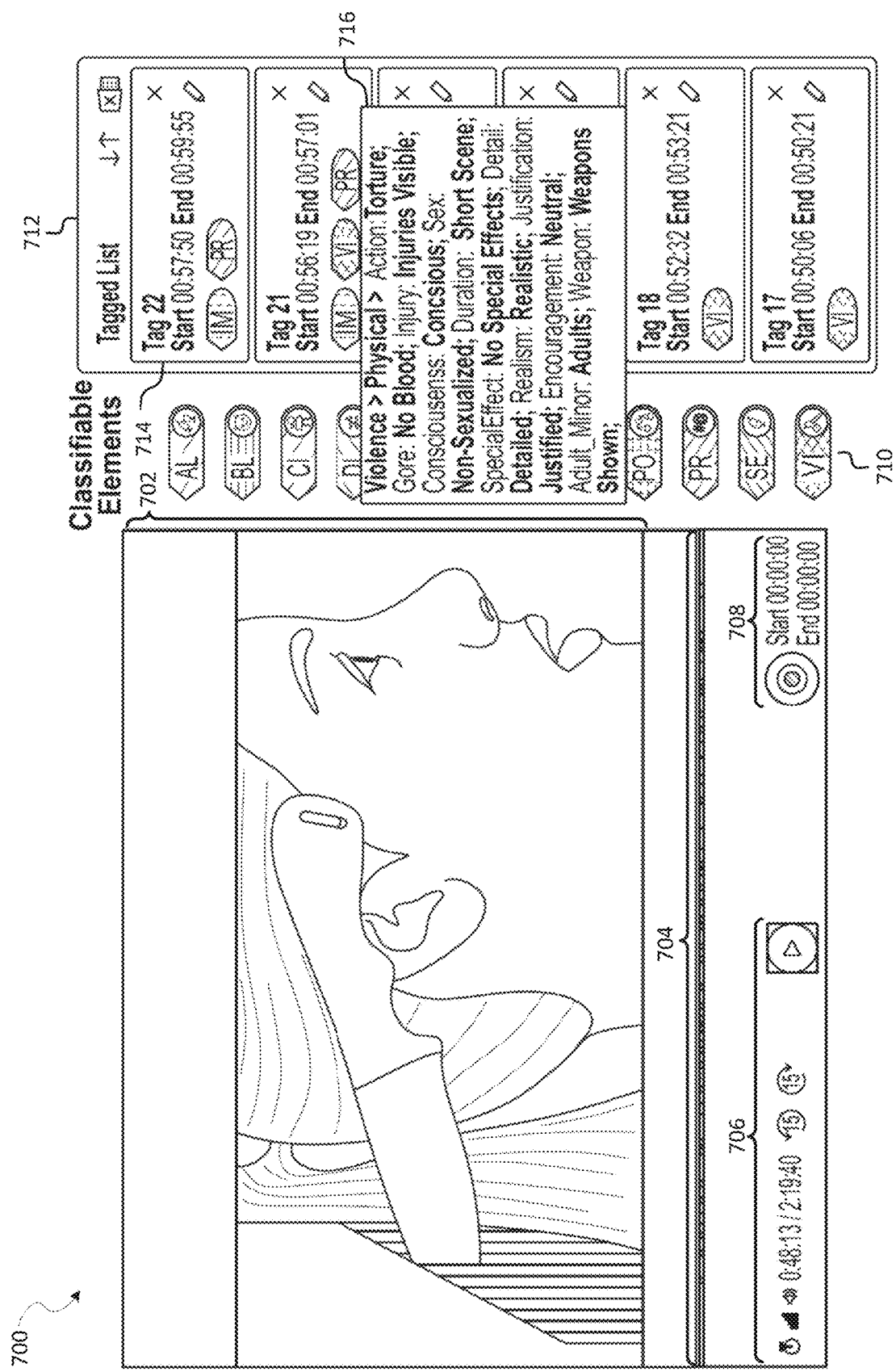
FIG. 7 illustrates an example graphical user interface for one or more events and associated event classification labels for a media asset, according to various embodiments of the present disclosure.

FIG. 7 illustrates an example graphical user interface 700 for one or more events and associated event classification labels for a media asset, according to various embodiments of the present disclosure. For some embodiments, the graphical user interface 700 is displayed on a client device, and enables a user to determine (e.g., identify) events or scenes in content of a media asset and to determine an event classification label for each event. As shown, the graphical user interface 700 includes a window 702 for viewing visual content of a media asset as a user is screening the media asset. The graphical user interface 700 includes a time bar 704 for the media asset and can indicate timestamps where events or scenes are located in the content of the media asset. The graphical user interface 700 includes content player controls 706 and graphical elements 708 for a user to indicate a start timestamp and an end timestamp for a scene in content of the media asset. For selecting an event classification label for an event in content of the media asset, the graphical user interface 700 includes a listing 710 of event classification labels ("Classifiable Elements"). For instance, while content of a media asset is being played, a user can enter a user input to select one of the event classification labels in the listing 710 and an event with the selected event classification label is created as a tag. As events and respective event classification labels are determined (e.g., identified or selected) by user inputs to the graphical user interface 700, a tag is generated in a listing 712 of tags ("Tagged List"), where each tag (e.g., 714) represents an event determined for the media asset and provides details for the event (e.g., an event classification label associated with the event, a start timestamp of an event or scene, an end timestamp of an event or scene). The graphical user interface 700 also illustrates an example panel 716 that lists the event subclassification labels for one of the tags. Details of a given tag (e.g., 714) can be selected for modification or removal by one or more user inputs to the graphical user interface 700.

Figure 8:
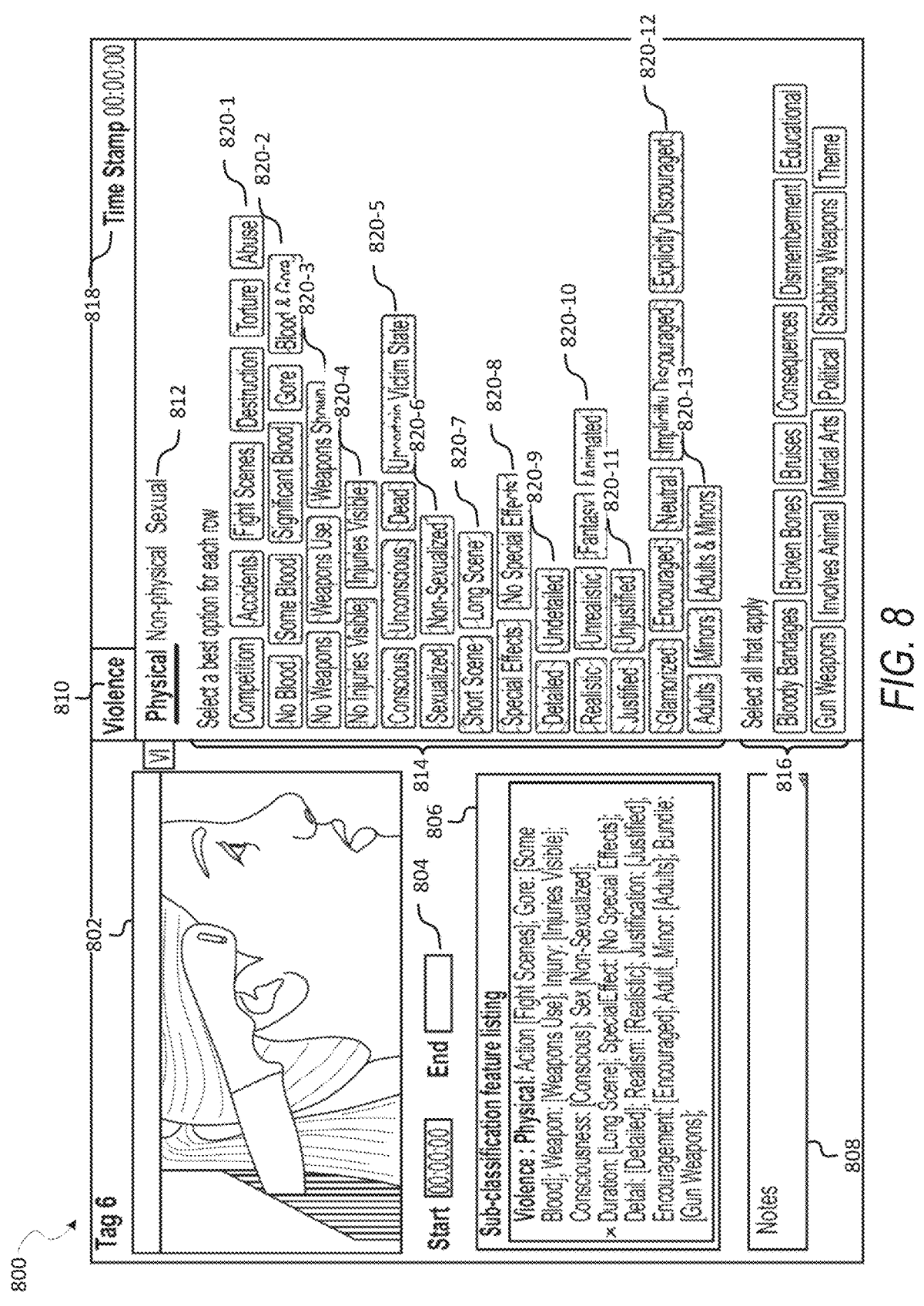

FIG. 8 illustrates an example graphical user interface 800 for one or more event subclassification labels for an event of a media asset, according to various embodiments of the present disclosure. For some embodiments, the graphical user interface 800 enables a user to view or edit one or more event subclassification labels in connection with an event, at a timestamp specified by field 818, associated with a particular event classification label. For instance, the graphical user interface 800 can be presented to a user at a client device in response to the user choosing to modify or view Tag 6 through the listing 712 of tags illustrated in FIG. 7. Panel 802 displays visual content of the media asset at the timestamp associated with the event. If Tag 6 were associated with a scene, fields 804 can indicate start and end timestamps for the scene. The graphical user interface 800 includes a feature listing 806 that lists subclassification labels currently selected for the event. Additionally, the graphical user interface 800 includes a notes section 808 for a user to enter notes (in connection with Tag 6) for the event.

As shown, the event is associated with a Tag 6, which is associated with an event classification label of 'Violence' (810) With respect to the 'Violence' event classification label, an event subclassification label of 'Physical' (812) is selected for the event. In sections 814 and 816, a user can view, enter, or modify event subclassification labels for the event. For instance, for each row (each of rows 820-1 through 820-13) of section 814, a user can select one event subclassification label from a set of available event subclassification labels. According to some embodiments, at least one event subclassification label needs to be selected for each row (each of rows 820-1 through 820-13) of section 814. In section 816, a user can select one or more event subclassification labels that apply to the event.

FIG. 9 illustrates an example graphical user interface 900 for one or more title attributes, according to various embodiments of the present disclosure. For some embodiments, the graphical user interface 900 enables a user to view or edit one or more title attributes for a media asset in sections 902 and 904. For instance, for each row (each of rows 910-1 through 910-8) of section 902, a user can select one title attribute value from available title attribute values. According to some embodiments, at least one title attribute value needs to be selected for each row (each of rows 910-1 through 910-8) of section 902. In section 904, a user can select one or more title attribute values that apply to the media asset.

Figure 10:
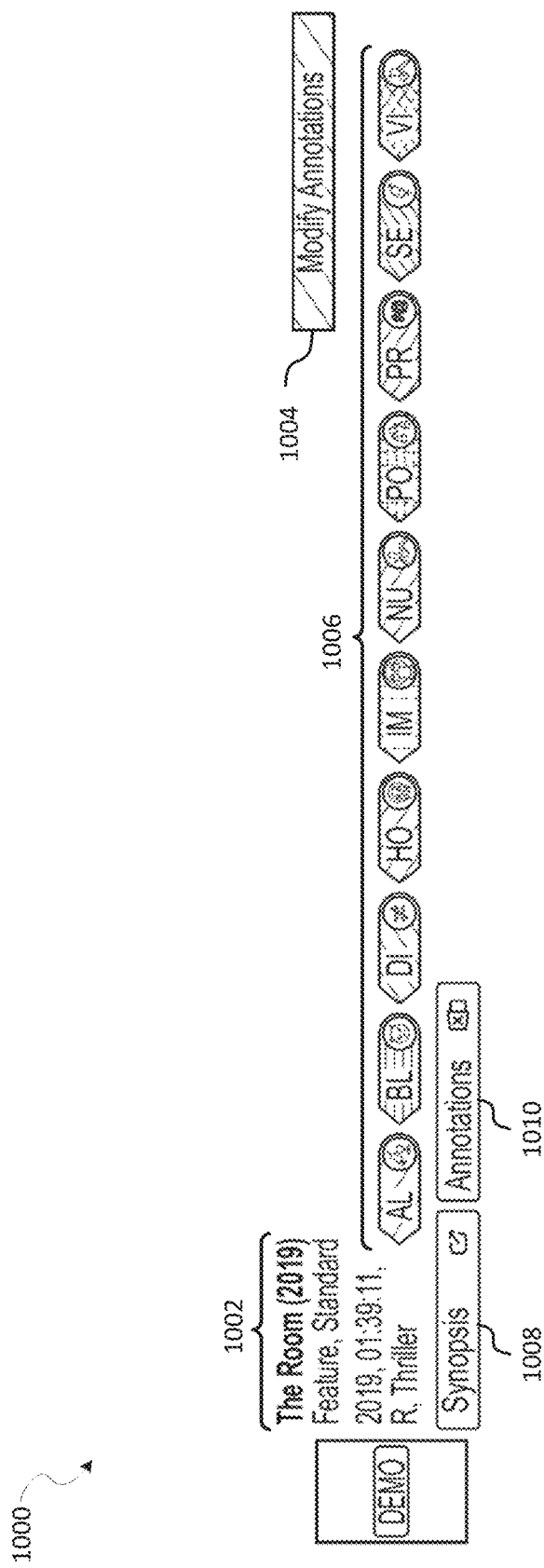
FIG. 10 illustrates an example graphical user interface that presents a media asset after event-based annotation, according to various embodiments of the present disclosure.

FIG. 10 illustrates an example graphical user interface 1000 that presents a media asset after event-based annotation, according to various embodiments of the present disclosure. For some embodiments, the graphical user interface 1000 provides a brief summary information for a media asset. As shown, the graphical user interface 1000 provides metadata 1002 for a media asset (e.g., a title, type of media asset, year of release, runtime, US rating, and genre). As also shown, the graphical user interface 1000 provides a listing 1006 of event classification labels that have been assigned to events or scenes of the media asset. Through the graphical user interface 1000, a user can select graphical button 1004 to modify event classification labels, event subclassification labels, or other annotations for the media asset. The user can also select to view a synopsis of the media asset by selecting a graphical button 1008 and select to export annotation for the media asset by selecting a graphical button 1010.

Figure 11:
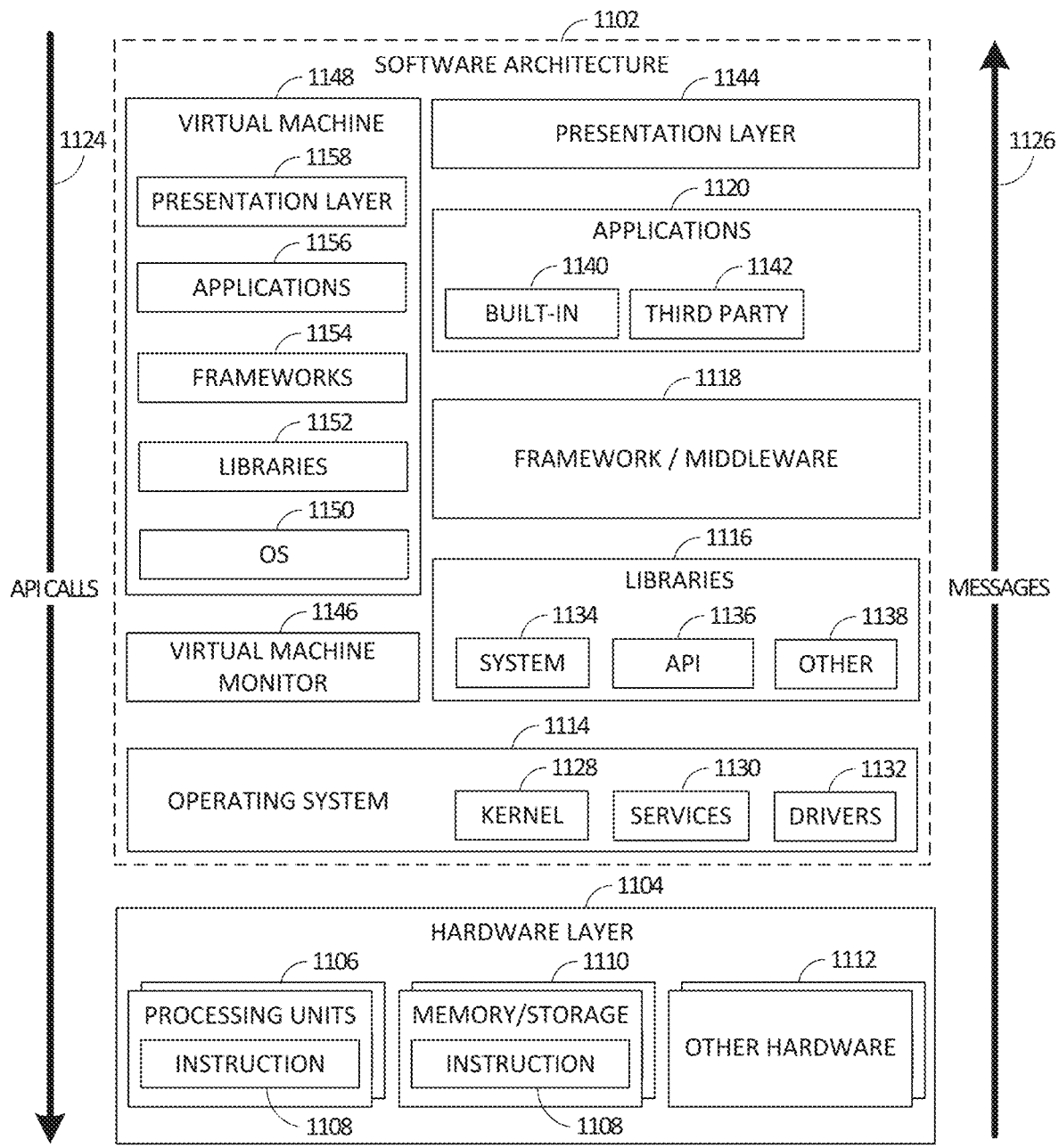
FIG. 11 is a block diagram illustrating a representative software architecture, which may be used in conjunction with various hardware architectures herein described, according to various embodiments of the present disclosure.
Figure 12:
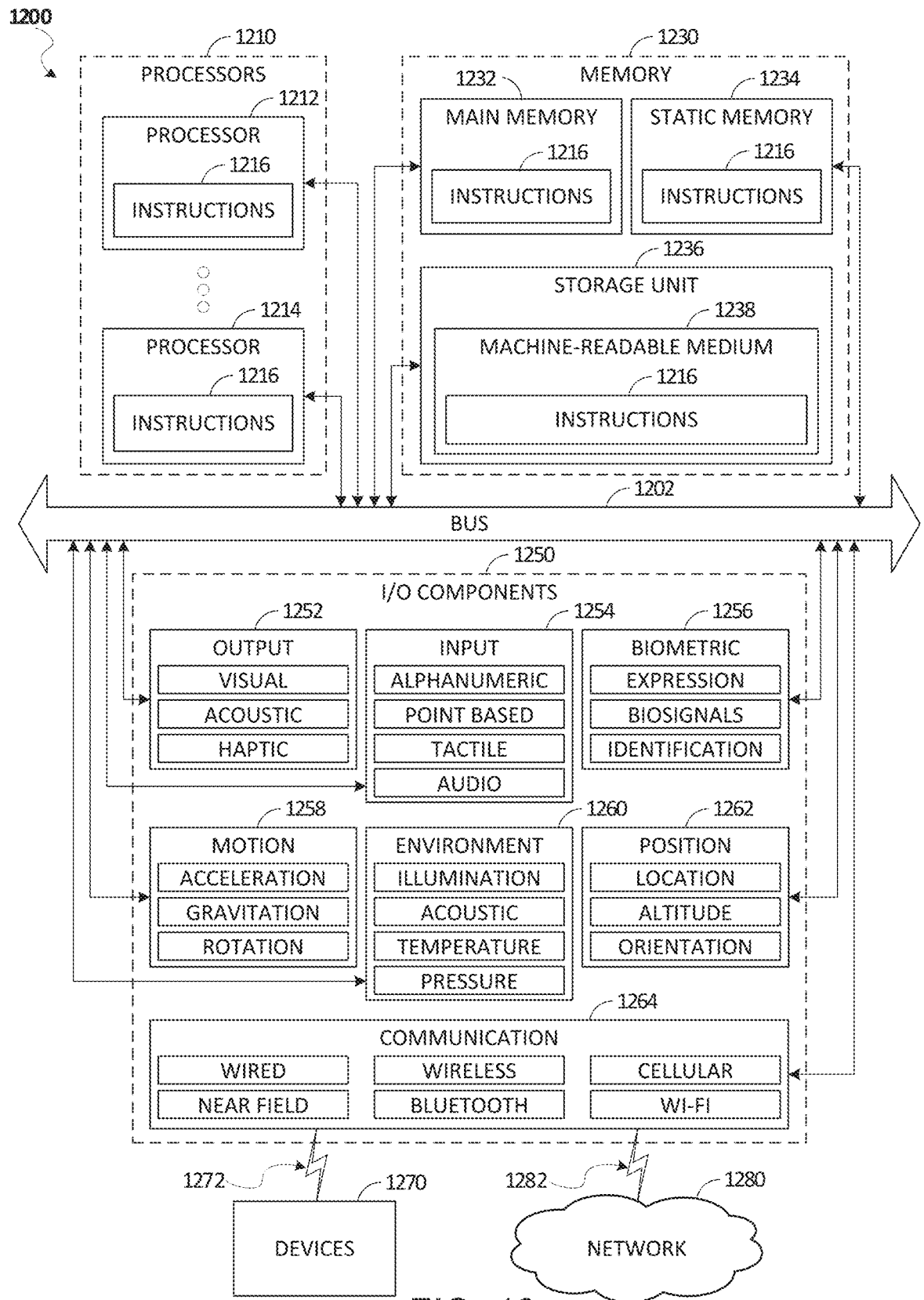
FIG. 12 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 11 or by way of the example machine illustrated by and described with respect to FIG. 12.

FIG. 11 is a block diagram illustrating an example of a software architecture 1102 that may be installed on a machine, according to some example embodiments. FIG. 11 is merely a non-limiting example of a software architecture, and it will be appreciated that many other architectures may be implemented to facilitate the functionality described herein. The software architecture 1102 may be executing on hardware such as a machine 1200 of FIG. 12 that includes, among other things, processors 1210, memory 1230, and input/output (I/O) components 1250. A representative hardware layer 1104 is illustrated and can represent, for example, the machine 1200 of FIG. 12. The representative hardware layer 1104 comprises one or more processing units 1106 having associated executable instructions 1108. The executable instructions 1108 represent the executable instructions of the software architecture 1102. The hardware layer 1104 also includes memory or storage modules 1110, which also have the executable instructions 1108. The hardware layer 1104 may also comprise other hardware 1112, which represents any other hardware of the hardware layer 1104, such as the other hardware illustrated as part of the machine 1200.

In the example architecture of FIG. 11, the software architecture 1102 may be conceptualized as a stack of layers, where each layer provides particular functionality. For example, the software architecture 1102 may include layers such as an operating system 1114, libraries 1116, frameworks/middleware 1118, applications 1120, and a presentation layer 1144. Operationally, the applications 1120 or other components within the layers may invoke API calls 1124 through the software stack and receive a response, returned values, and so forth (illustrated as messages 1126) in response to the API calls 1124. The layers illustrated are representative in nature, and not all software architectures have all layers. For example, some mobile or special-purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 or other software components/modules. For example, the frameworks 1118 may provide various graphical user interface functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a home application, a contacts application, a browser application, a book reader application, a location application, a media application, a messaging application, or a game application.

The third-party applications 1142 may include any of the built-in applications 1140, as well as a broad assortment of other applications. In a specific example, the third-party applications 1142 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 1142 may invoke the API calls 1124 provided by the mobile operating system such as the operating system 1114 to facilitate functionality described herein.

The applications 1120 may utilize built-in operating system functions (e.g., kernel 1128, services 1130, or drivers 1132), libraries (e.g., system libraries 1134, API libraries 1136, and other libraries 1138), or frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with the user.

Some software architectures utilize virtual machines. In the example of FIG. 11, this is illustrated by a virtual machine 1148. The virtual machine 1148 creates a software environment where applications/modules can execute as if they were executing on a hardware machine (e.g., the machine 1200 of FIG. 12). The virtual machine 1148 is hosted by a host operating system (e.g., the operating system 1114) and typically, although not always, has a virtual machine monitor 1146, which manages the operation of the virtual machine 1148 as well as the interface with the host operating system (e.g., the operating system 1114). A software architecture executes within the virtual machine 1148, such as an operating system 1150, libraries 1152, frameworks/middleware 1154, applications 1156, or a presentation layer 1158. These layers of software architecture executing within the virtual machine 1148 can be the same as corresponding layers previously described or may be different.

FIG. 12 illustrates a diagrammatic representation of a machine 1200 in the form of a computer system within which a set of instructions may be executed for causing the machine 1200 to perform any one or more of the methodologies discussed herein, according to an embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute the method 400 described above with respect to FIG. 4. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an embodiment, the processors 1210 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory 1230 may include a main memory 1232, a static memory 1234, and a storage unit 1236 including machine-readable medium 1238, each accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various embodiments, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1250 may include biometric components 1256, motion components 1258, environmental components 1260, or position components 1262, among a wide array of other components. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein. "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1200 including processors 1210), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1200, but deployed across a number of machines 1200. In some example embodiments, the processors 1210 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 1230, 1232, 1234, and/or the memory of the processor(s) 1210) and/or the storage unit 1236 may store one or more sets of instructions 1216 and data structures (e.g., software) embodying or utilized by any one or more of the methodologies or functions described herein. These instructions (e.g., the instructions 1216), when executed by the processor(s) 1210, cause various operations to implement the disclosed embodiments.

As used herein, the terms "machine-storage medium." "device-storage medium." and "computer-storage medium" mean the same thing and may be used interchangeably. The terms refer to a single or multiple storage devices and/or media (e.g., a centralized or distributed database, and/or associated caches and servers) that store executable instructions 1216 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks' and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 1280 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium." and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
    accessing, by a hardware processor, content data for a current media asset;
    determining, by the hardware processor, a set of events within the content data by scanning the content data for events that relate to at least one event classification, each event in the set of events comprising at least one of a visual content element, a textual content feature, or an audio content feature from the content data being presented at a timestamp of the current media asset, each event in the set of events being associated with an event classification label selected from a predetermined event classification library, the predetermined event classification library comprising a plurality of event classification labels where each event classification label comprises a set of available event subclassification labels;
    for each individual event in the set of events and based on an identified event classification label of the individual event, determining a set of identified event subclassification labels for the individual event, the set of identified event subclassification labels being selected from the set of available subclassification labels for the identified event classification as provided by the predetermined event classification library, at least one identified event subclassification label in the set of identified event subclassification labels describing at least:
        an intent of a context of the individual event; and
        an outcome of the context of the individual event;
    determining, by the hardware processor, a set of scenes within the content data, each scene in the set of scenes comprising a subset of events from the set of events;
    for each individual scene in the set of scenes, determining a set of scene attributes for the individual scene;
    determining, by the hardware processor, a set of themes for the current media asset based on at least one of the set of scenes or the set of scene attributes;
    determining, by the hardware processor, a set of title attributes for the current media asset based on at least the set of themes and metadata associated with the media asset; and
    generating, by the hardware processor, contextual data for the current media asset based on at least one of the set of events, the set of event classification labels determined for the set of events, the sets of identified event subclassification labels determined for the set of events, the set of scenes, sets of scene attributes for the set of scenes, the set of themes, or the set of title attributes.

2. The method of claim 1, wherein the predetermined event classification library is configured such that event classification labels and event subclassification labels of the predetermined event classification library cause events in the current media asset to be classified without cultural bias.

3. The method of claim 1, wherein an individual event subclassification label determined for the individual event provides detail with respect to a context of the individual event.

4. The method of claim 3, wherein the individual event subclassification label describes at least: a description of the context of the individual event; an explanation of the context of the individual event; an how the context of the individual event is presented in the content data of the current media asset.

5. The method of claim 1, comprising:
    causing, by the hardware processor, display of a graphical user interface for screening the current media asset, the graphical user interface being configured to receive user input that identifies at least one of:
        one or more events in the content data of the current media asset;
        one or more event classification labels for an event of the current media asset;
        one or more event subclassification labels for an event of the current media;
        one or more scenes in the content data of the current media asset;
        one or more themes for the current media asset; or
        one or more title attributes for the current media asset.

6. The method of claim 1, wherein the scanning of the media asset is performed using an event scanner; and wherein the event scanner comprises a machine learning model trained to automatically identify a select event at a select timestamp of the current media asset based on a set of signals provided by at least one computer vision analysis, audio analysis, or natural language processing of content presented by the current media asset at the select timestamp.

7. The method of claim 6, wherein the machine learning model is trained based on contextual data of another media asset.

8. The method of claim 6, comprising:
    causing the machine learning model to further train using at least a portion of the generated contextual data.

9. The method of claim 1, wherein the determining the set of identified event subclassification labels for the individual event is performed using an event classifier, wherein the individual event is at a select timestamp of the current media asset; and wherein the event classifier comprises a machine learning model trained to automatically identify the set of identified event subclassification labels for the individual event based on a set of signals provided by at least one computer vision analysis, audio analysis, or natural language processing of content presented by the current media asset at the select timestamp.

10. The method of claim 9, wherein the machine learning model is trained based on contextual data of another media asset.

11. The method of claim 9, comprising:
causing the machine learning model to further train using at least a portion of the generated contextual data.

12. The method of claim 1, wherein the determining the set of scene attributes for the individual scene is performed using a scene analyzer; and wherein the scene analyzer comprises a machine learning model trained to automatically identify the set of scene attributes for the individual scene based on at least one of:
   one or more events of the individual scene;
   one or more event classification labels for the one or more events; or
   one or more event subclassification labels for the one or more events.

13. The method of claim 12, wherein the machine learning model is trained based on contextual data of another media asset.

14. The method of claim 12, comprising:
causing the machine learning model to further train using at least portion of the generated contextual data.

15. The method of claim 1, wherein the determining the set of scene attributes for the individual scene comprises determining at least one of:
   determining a frequency of events in the individual scene;
   determining a mixture of events, with different event classification labels, in the individual scene;
   determining a time distance between events in the individual scene; or
   determining a duration of the individual scene.

16. The method of claim 1, wherein the determining of the set of themes for the current media asset is performed using a theme analyzer; and wherein the theme analyzer comprises a machine learning model trained to automatically identify the set of themes for the current media asset based on at least one of the set of scenes or the set of scene attributes.

17. The method of claim 16, wherein the machine learning model is trained based on contextual data of another media asset.

18. The method of claim 16, comprising:
causing the machine learning model to further train using at least a portion of the generated contextual data.

19. The method of claim 1, comprising:
causing, by the hardware processor, display of a graphical user interface for screening the current media asset, the graphical user interface including a time bar for the content data of the current media asset, and the time bar including a visual indicator for each timestamp of the current media asset that is associated with a select event from the set of events or a select scene from the set of scenes.

20. The method of claim 1, comprising:
causing, by the hardware processor, display of a graphical user interface for screening the current media asset, the graphical user interface including a listing of tags that correspond to events from the set of events or scenes from the set of scenes.

21. The method of claim 20, wherein in the listing of tags, a select tag for a select event or a select scene is displayed with one or more event classification labels of the select event or the select scene.

22. The method of claim 1, comprising:
causing, by the hardware processor, a media software tool configured to process the current media asset based on the contextual data for the current media asset.

23. The method of claim 1, wherein the metadata comprises at least one of: an attribute describing a genre of the current media asset; an attribute describing how the content data of the current media asset is presented; an attribute describing a cast or a crew member listed for the current media asset; an attribute describing entities involved in production of the current media asset; an attribute describing a production or release date for the current media asset; or a runtime of the current media asset.

24. A system comprising:
a memory storing instructions; and
one or more hardware processors communicatively coupled to the memory and configured by the instructions to perform operations comprising:
   accessing content data for a current media asset;
   determining a set of events within the content data by scanning the content data for events that relate to at least one event classification, each event in the set of events comprising at least one of a visual content element, a textual content feature, or an audio content feature from the content data being presented at a timestamp of the current media asset, each event in the set of events being associated with an event classification label selected from a predetermined event classification library, the predetermined event classification library comprising a plurality of event classification labels where each event classification label comprises a set of available event subclassification labels;
   for each individual event in the set of events and based on an identified event classification label of the individual event, determining a set of identified event subclassification labels for the individual event, the set of identified event subclassification labels being selected from the set of available subclassification labels for the identified event classification as provided by the predetermined event classification library, at least one identified event subclassification label in the set of identified event subclassification labels describing at least:
      an intent of a context of the individual event; and
      an outcome of the context of the individual event;
   determining a set of scenes within the content data, each scene in the set of scenes comprising a subset of events from the set of events;
   for each individual scene in the set of scenes, determining a set of scene attributes for the individual scene;
   determining a set of themes for the current media asset based on at least one of the set of scenes or the set of scene attributes;
   determining a set of title attributes for the current media asset based on at least the set of themes and metadata associated with the media asset; and
   generating contextual data for the current media asset based on at least one of the set of events, the set of event classification labels determined for the set of events, the sets of identified event subclassification labels determined for the set of events, the set of scenes, sets of scene attributes for the set of scenes, the set of themes, or the set of title attributes.

25. A non-transitory computer-readable medium comprising instructions that, when executed by a hardware processor of a device, cause the device to perform operations comprising:
- accessing content data for a current media asset;
- determining a set of events within the content data by scanning the content data for events that relate to at least one event classification, each event in the set of events comprising at least one of a visual content element, a textual content feature, or an audio content feature from the content data being presented at a timestamp of the current media asset, each event in the set of events being associated with an event classification label selected from a predetermined event classification library, the predetermined event classification library comprising a plurality of event classification labels where each event classification label comprises a set of available event subclassification labels;
- for each individual event in the set of events and based on an identified event classification label of the individual event, determining a set of identified event subclassification labels for the individual event, the set of identified event subclassification labels being selected from the set of available subclassification labels for the identified event classification as provided by the predetermined event classification library, at least one identified event subclassification label in the set of identified event subclassification labels describing at least:
  - an intent of a context of the individual event; and
  - an outcome of the context of the individual event;
- determining a set of scenes within the content data, each scene in the set of scenes comprising a subset of events from the set of events;
- for each individual scene in the set of scenes, determining a set of scene attributes for the individual scene;
- determining a set of themes for the current media asset based on at least one of the set of scenes or the set of scene attributes;
- determining a set of title attributes for the current media asset based on at least the set of themes and metadata associated with the media asset; and
- generating contextual data for the current media asset based on at least one of the set of events, the set of event classification labels determined for the set of events, the sets of identified event subclassification labels determined for the set of events, the set of scenes, sets of scene attributes for the set of scenes, the set of themes, or the set of title attributes.

* * * * *